(12) United States Patent
Henderson

(10) Patent No.: US 8,775,476 B2
(45) Date of Patent: Jul. 8, 2014

(54) SYSTEM AND METHOD FOR CREATING, DEPLOYING, INTEGRATING, AND DISTRIBUTING NODES IN A GRID OF DISTRIBUTED GRAPH DATABASES

(75) Inventor: Charles E. Henderson, Lexington, VA (US)

(73) Assignee: Skai, Inc., Arlington, VA (US)

( * ) Notice: Subject to any disclaimer, the term of this patent is extended or adjusted under 35 U.S.C. 154(b) by 0 days.

(21) Appl. No.: 13/341,401

(22) Filed: Dec. 30, 2011

(65) Prior Publication Data

US 2012/0209886 A1    Aug. 16, 2012

Related U.S. Application Data

(60) Provisional application No. 61/428,553, filed on Dec. 30, 2010.

(51) Int. Cl.
*G06F 17/30* (2006.01)
(52) U.S. Cl.
USPC .......................................................... 707/798
(58) Field of Classification Search
CPC ........................... G06F 17/509; G06F 11/0709
USPC .............................. 707/687, 790, 798; 706/54
See application file for complete search history.

(56) References Cited

U.S. PATENT DOCUMENTS

| | | | |
|---|---|---|---|
| 7,698,346 B2 | 4/2010 | Henderson | |
| 2005/0235011 A1* | 10/2005 | Minium et al. | 707/203 |
| 2008/0243770 A1* | 10/2008 | Aasman | 707/2 |
| 2008/0281801 A1* | 11/2008 | Larson et al. | 707/4 |
| 2009/0024946 A1* | 1/2009 | Gotz | 715/769 |
| 2009/0303239 A1* | 12/2009 | Ang et al. | 345/440 |
| 2010/0023834 A1* | 1/2010 | Richardson et al. | 714/751 |
| 2010/0145902 A1* | 6/2010 | Boyan et al. | 706/54 |
| 2011/0216696 A1* | 9/2011 | Lippolis et al. | 370/328 |

OTHER PUBLICATIONS

Notification of Transmittal of the International Search Report and the Written Opinion of the International Searching Authority, or the Declaration issued Apr. 30, 2012 in the corresponding PCT Application No. PCT/US2011/68152.

* cited by examiner

*Primary Examiner* — Hung T Vy
(74) *Attorney, Agent, or Firm* — McGuireWoods LLP; Charles J. Gross

(57) ABSTRACT

In a computer environment, a system and method is described that generally provides for creation of a distributed graph database, creation and deployment of nodes in a distributed graph database system, and integration of nodes into a set of distributed graph databases that include data nodes and edges that are: entities built using forms, relations, and relationships; immutable but evolvable through the addition of new data nodes or new edges joining the evolving data node to another data node; shareable and mergeable.

17 Claims, 27 Drawing Sheets

Exemplary GraphNet Architecture – Acme Incorporated

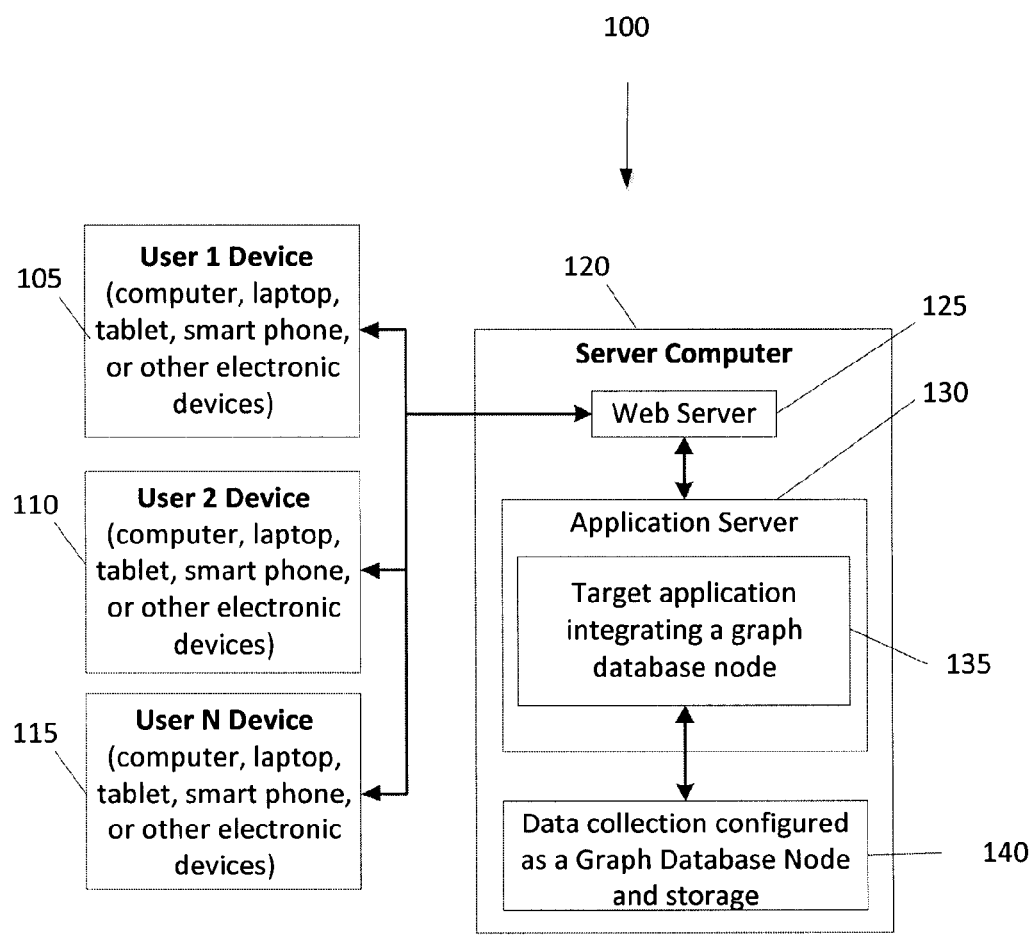
Figure 1. Architecture of an Example System Incorporating a Graph DBN

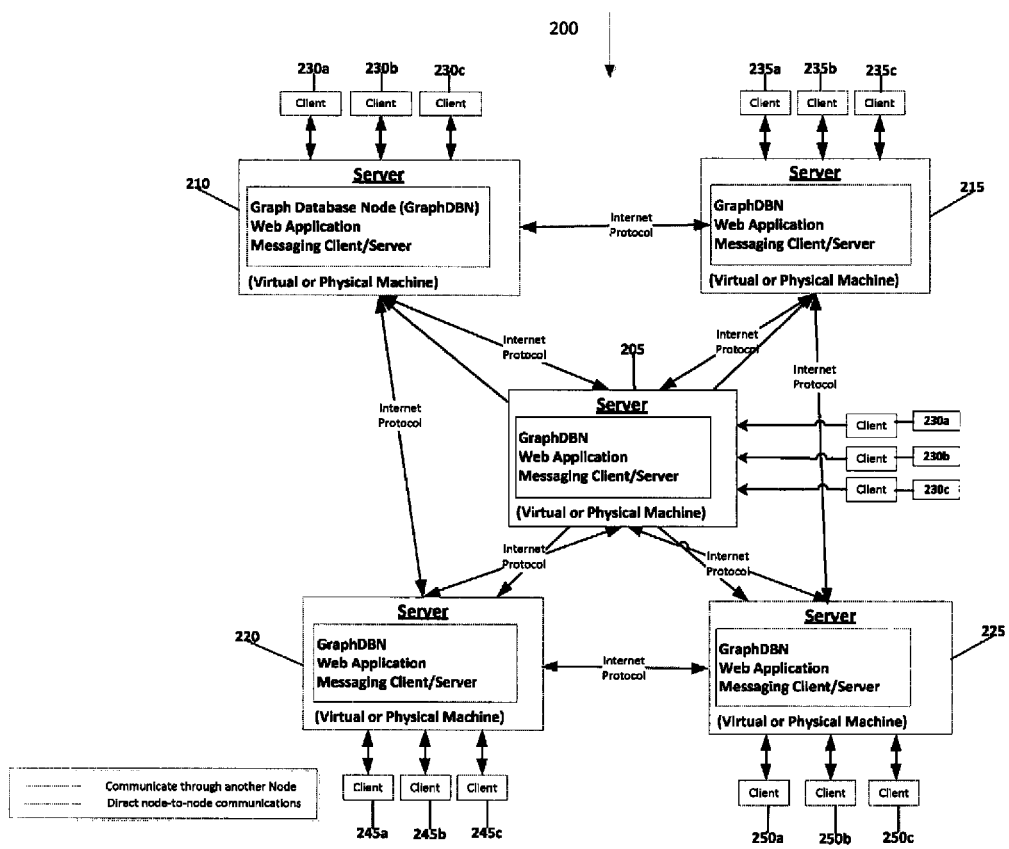
Figure 2. Architecture of an Example Architecture of a Grid of Graph Databases Configured According to the Principles of the Disclosure

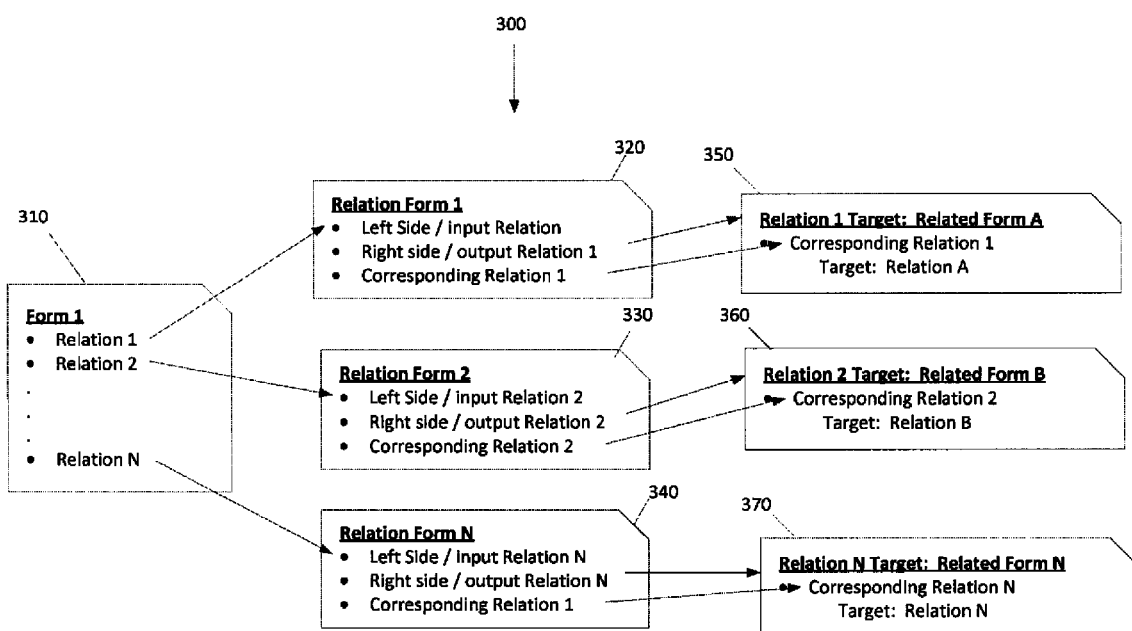
Figure 3. Forms, Relations, and Corresponding Relations

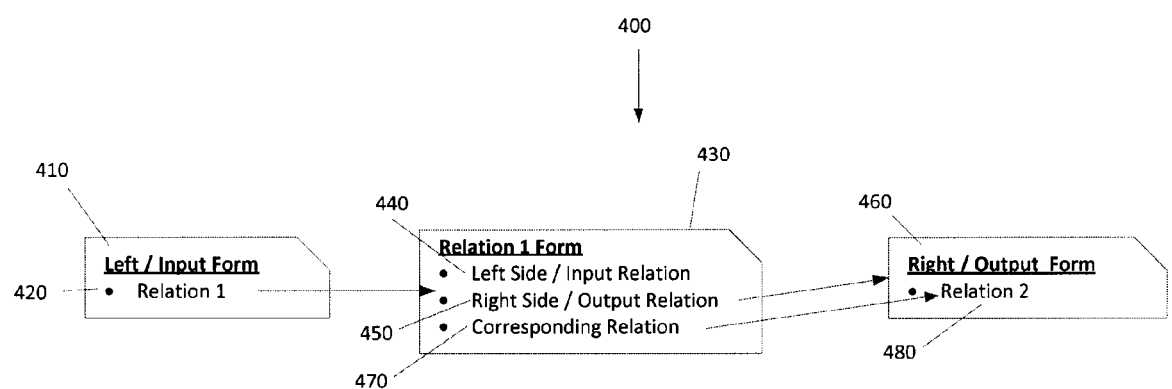
Figure 4. Relation Form

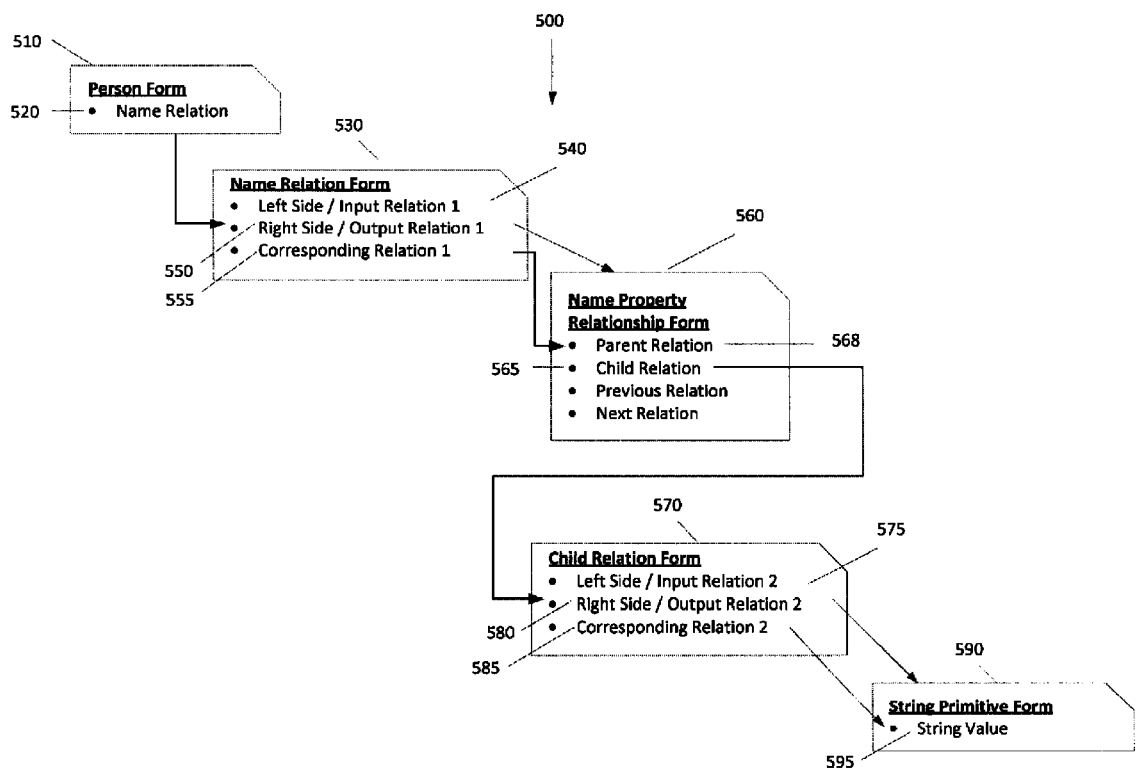
Figure 5. Example Name Relation Form with Left Side Relation and Right Side Relation

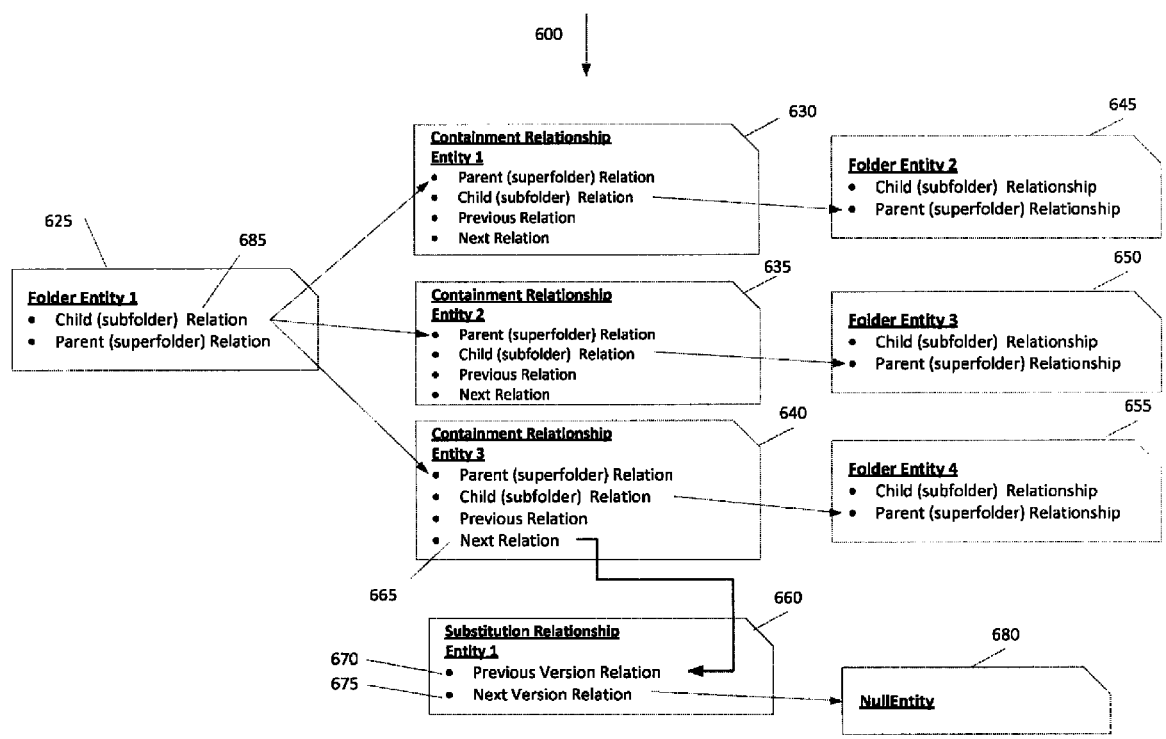
Figure 6. Relationship Entity Signifying Change to a Relation

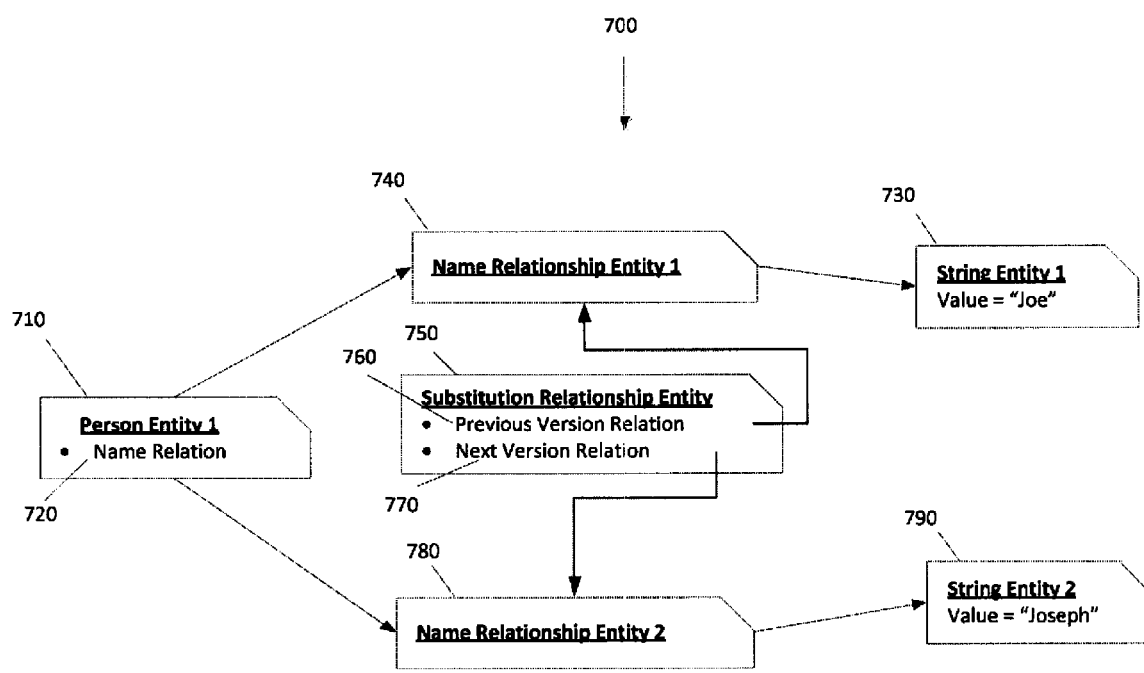
Figure 7. Simplified Example of a Substitution Relationship

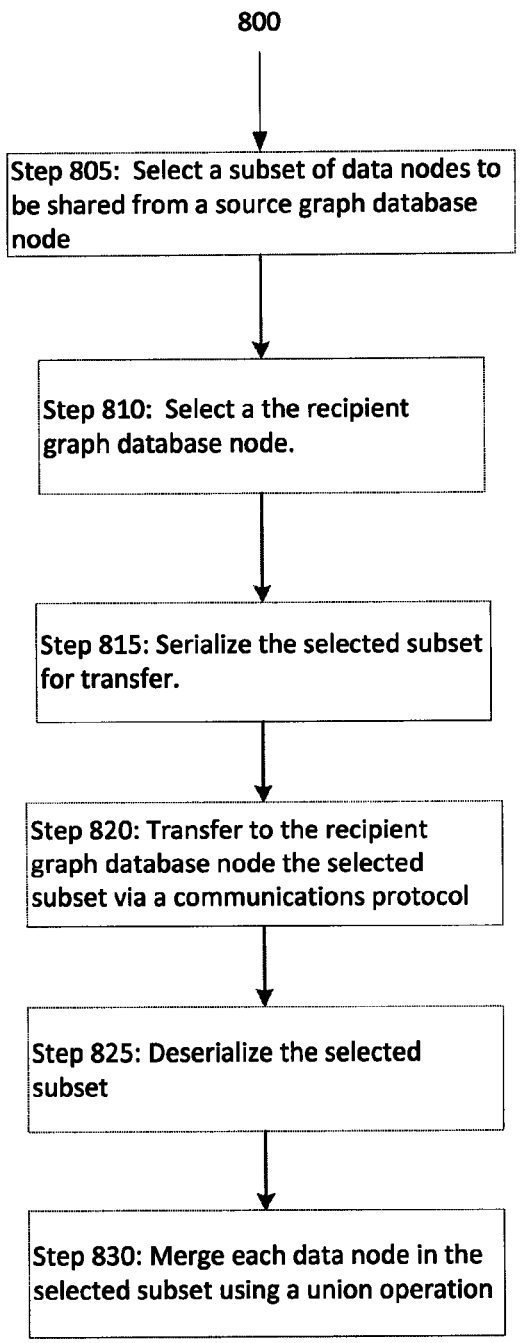
Figure 8. Sharing and Merging a Subset of a Source Graph Database Node with a Recipient Graph Database Node

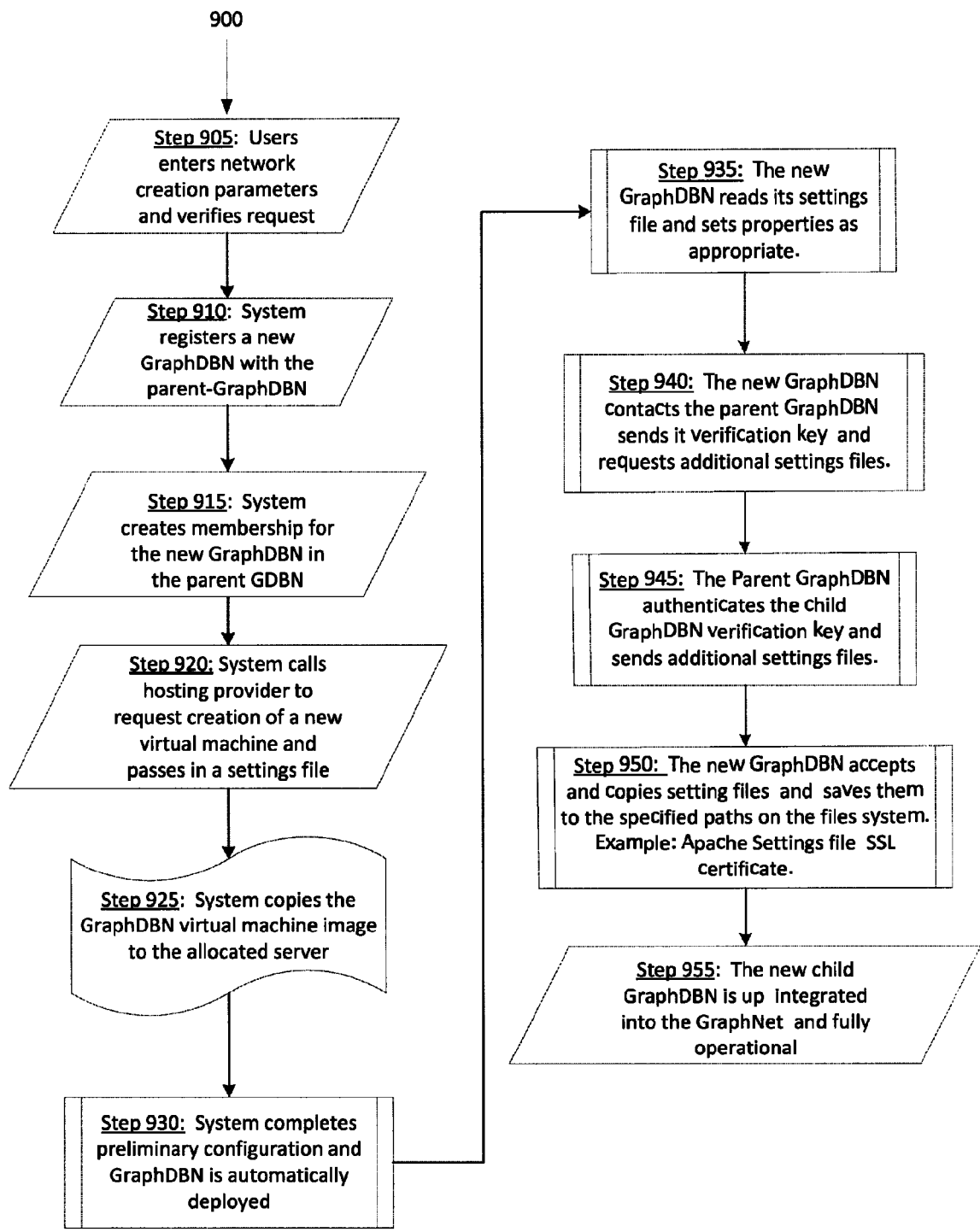
Figure 9. Exemplary Process for Creating Deploying and Integrating a New GraphDBN in a GraphNet

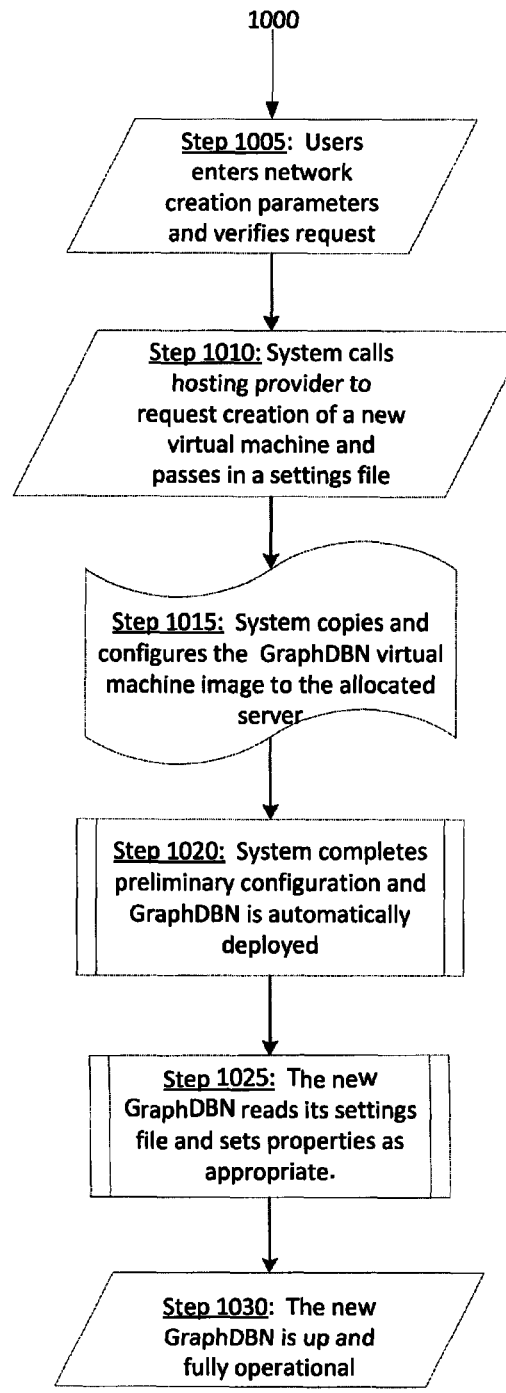
Figure 10. Exemplary Process for Creating Deploying and Integrating a
New GraphDBN in a Loosely Coupleable Configuration

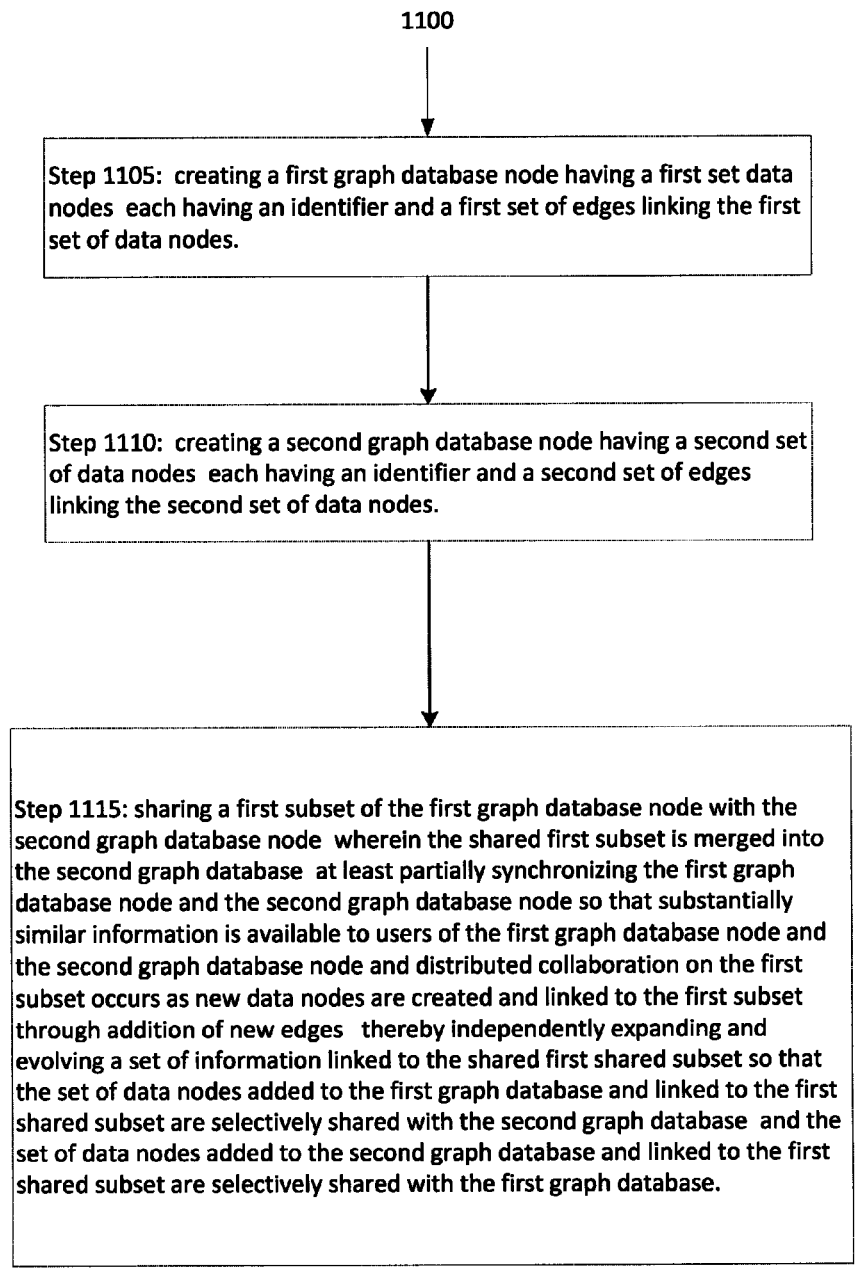
Figure 11. Another Exemplary Process for Creating Deploying and Integrating a New GraphDBN in a Loosely Coupleable Configuration

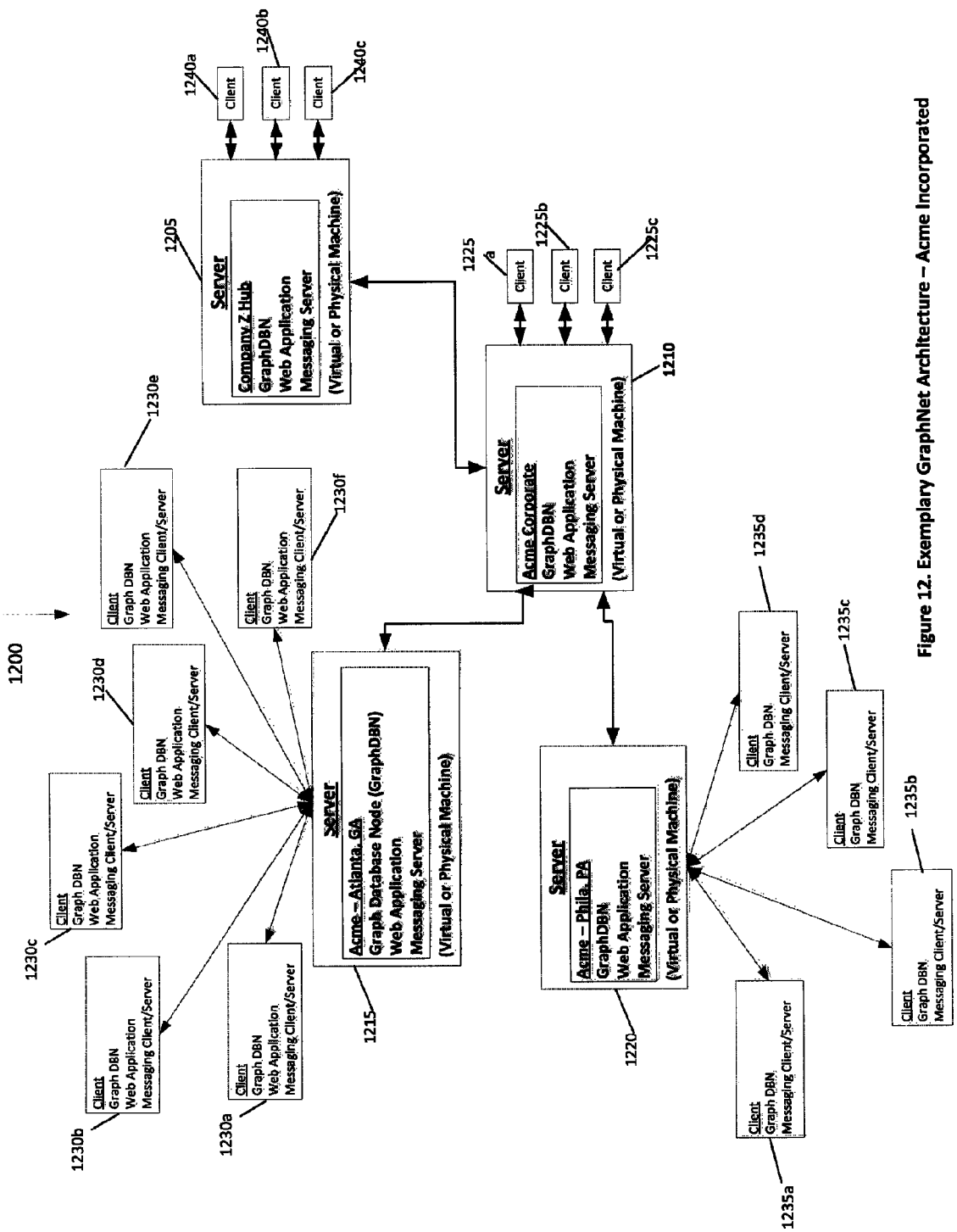
Figure 12. Exemplary GraphNet Architecture – Acme Incorporated

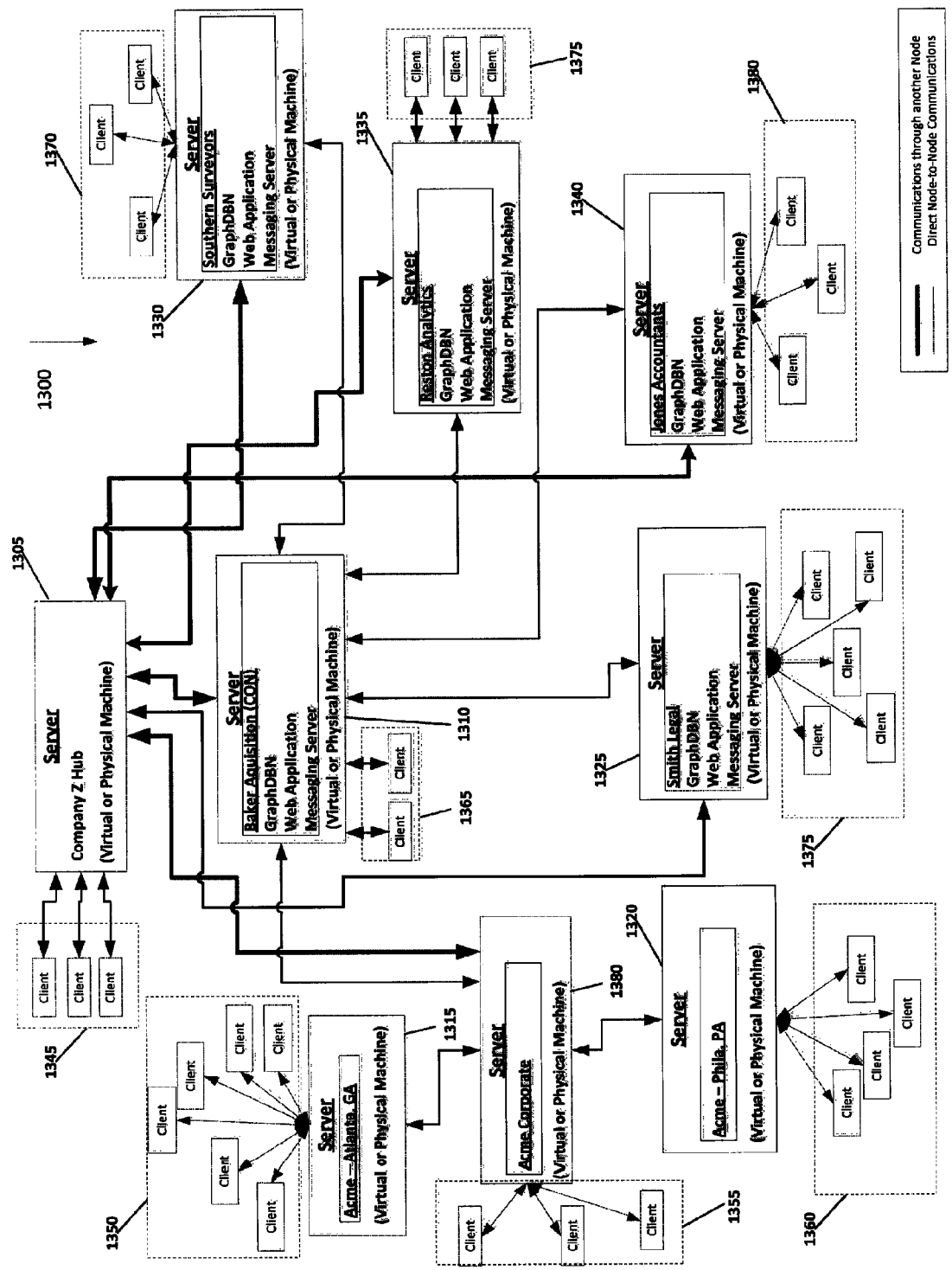
Figure 13. Expanded GraphNet Architecture

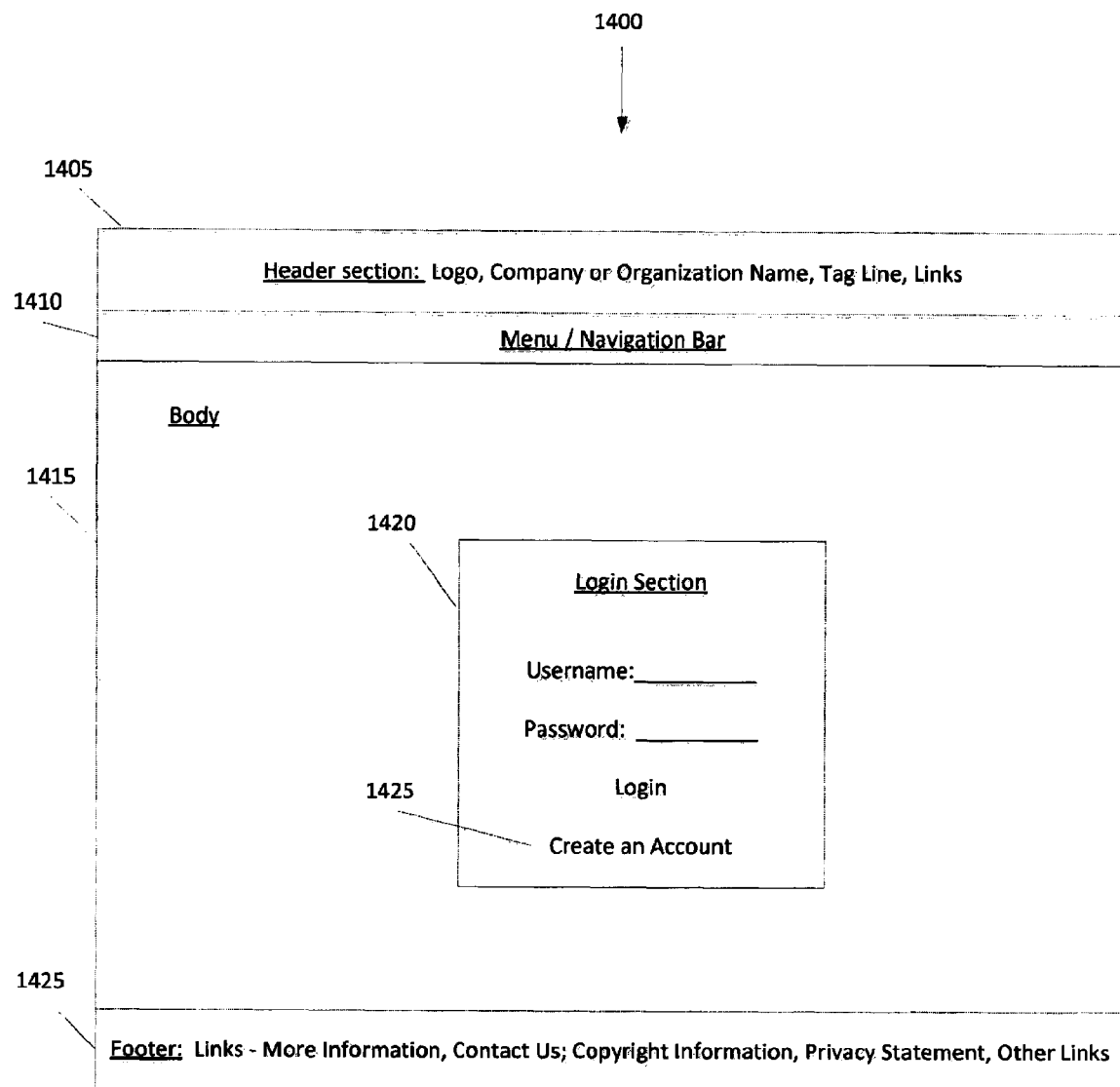
Figure 14. Login Page

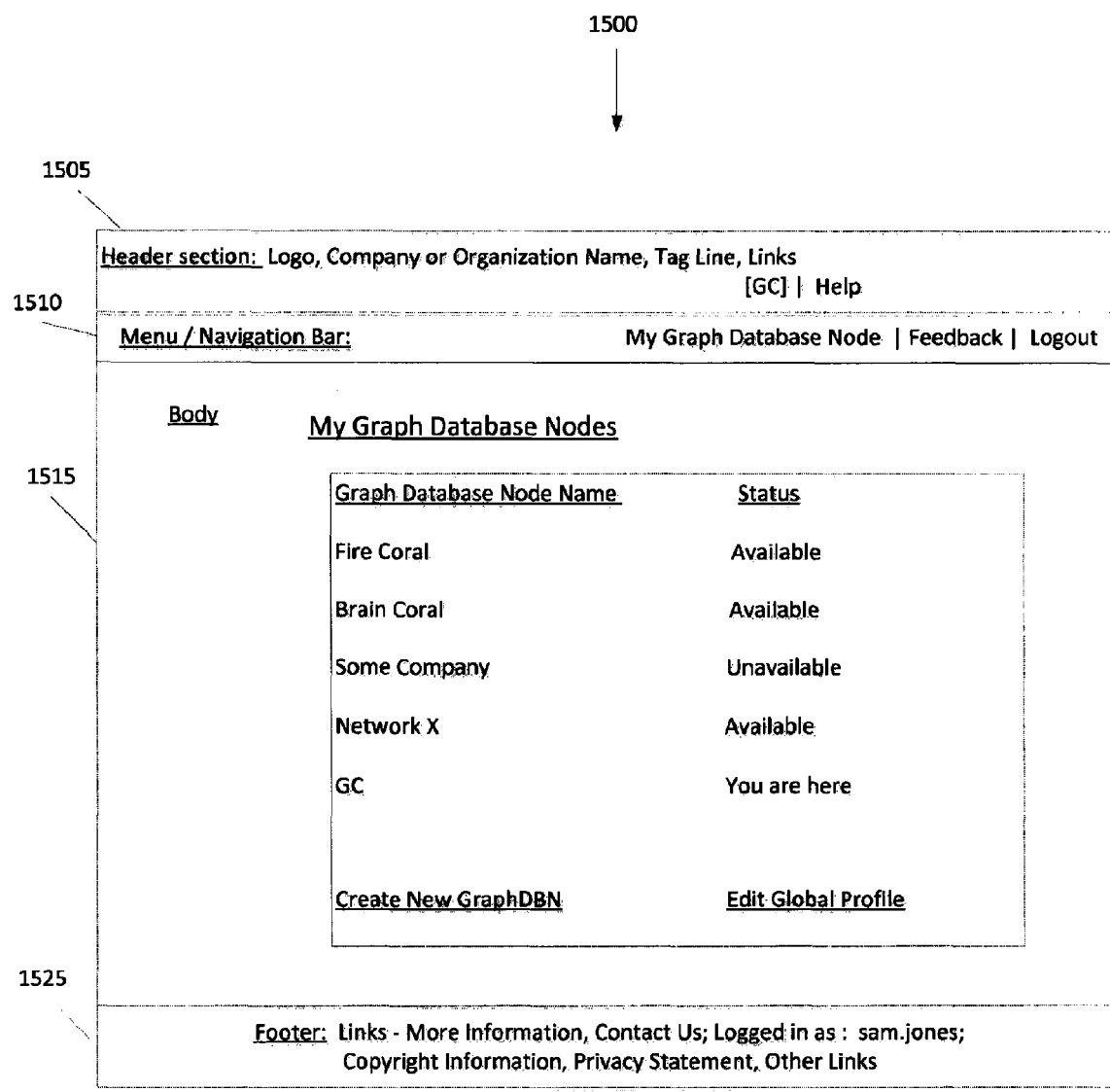
Figure 15. My Graph Database Nodes Page

1600

1605

1610 — Header section: Logo, Company or Organization Name, Tag Line, Links
[GC] | Help

Menu / Navigation Bar: My Graph Database Nodes | Feedback | Logout

1615 — Body  Enter Graph Database Node Name and Description

Name for your graph database node: _____

Domain Name for your graph database node: _____

Description of your graph database node

[  text area  ]

Cancel   Next

1620 — Footer: Links - More Information, Contact Us; Logged in as : sam.jones;
Copyright Information, Privacy Statement, Other Links Figure 16. Create Graph Database Node and Application -
Enter Name and Description

1700

1705

Header section: Logo, Company or Organization Name, Tag Line, Links
[GC] | Help

1710

Menu / Navigation Bar: My Graph Database Nodes | Feedback | Logout

Body      Enter Graph Database Node Contact and Security Information

1715

Organization Information

*Organization Name:: _____

*Organization Web Address:: _____

Contact Person for your Organization

*First Name _____

*Last Name_____
        *Email _____

*Confirm Email _____

Administrator for your Organization

*Administrator First Name _____

*Administrator Last Name_____

*Administrator Email _____

*Confirm Administrator Email _____

1720

| Next | Cancel |

Footer: Links - More Information, Contact Us; Logged in as : sam.jones;
Copyright Information, Privacy Statement, Other Links Figure 17. Create Graph Database Node and Application –
Enter Contact and Security Information

1800

1805

Header section: Logo, Company or Organization Name, Tag Line, Links
[GC] | Help

1810

Menu / Navigation Bar:  My Graph Database Nodes | Feedback | Logout

Body    Graph Database Node and Application License, Terms, and Conditions of Use

1815

Review the Graph Database Node and application terms, conditions, license, and policies. Click 'I agree' to continue the creating, or 'I do not agree' to cancel the creation process.

Terms

Conditions

License

Etc.

○ I Agree          I do not agree

1820

| Next | Cancel |

Footer: Links - More Information, Contact Us; Logged in as : sam.jones; Copyright Information, Privacy Statement, Other Links Figure 18. Create Graph Database Node and Application –
License, Terms, and Conditions of Use

1900

1905

Header section: Logo, Company or Organization Name, Tag Line, Links
[GC] | Help

1910

Menu / Navigation Bar: My GraphDBNs | Feedback | Logout

Body          Confirm Network Information

1915

Graph Database Node Name and Description
- Name for your Network: Acme
- Domain Name for your Network: acme@coralnetworks.com
- Description of your Network: At Acme, Inc, we do everything from making widgets to supplying specialized gadgets

Organization Information
- Organization Name: Acme, Inc.
- Organization Web Address: www.acme.com

Contact Person for your Organization
- First Name: Sam
- Last Name: Jones
- Email: sam.jones@acme.com
- Phone Number: 703.555.1212

Administrator for your Organization
- First Name: Anne
- Last Name: Wilson
- Email: anne.wilson@acme.com
- Phone Number: 703-555-1212

Terms and Conditions: I have read, understand, and agree to the Coral Networks, Inc. terms, conditions, and license restrictions.

1920

[ Confirm ]    [ Cancel ]

Footer: Links - More Information, Contact Us; Logged in as : sam.jones; Copyright Information, Privacy Statement, Other Links Figure 19. Create Graph Database Node and Application – Confirm Information

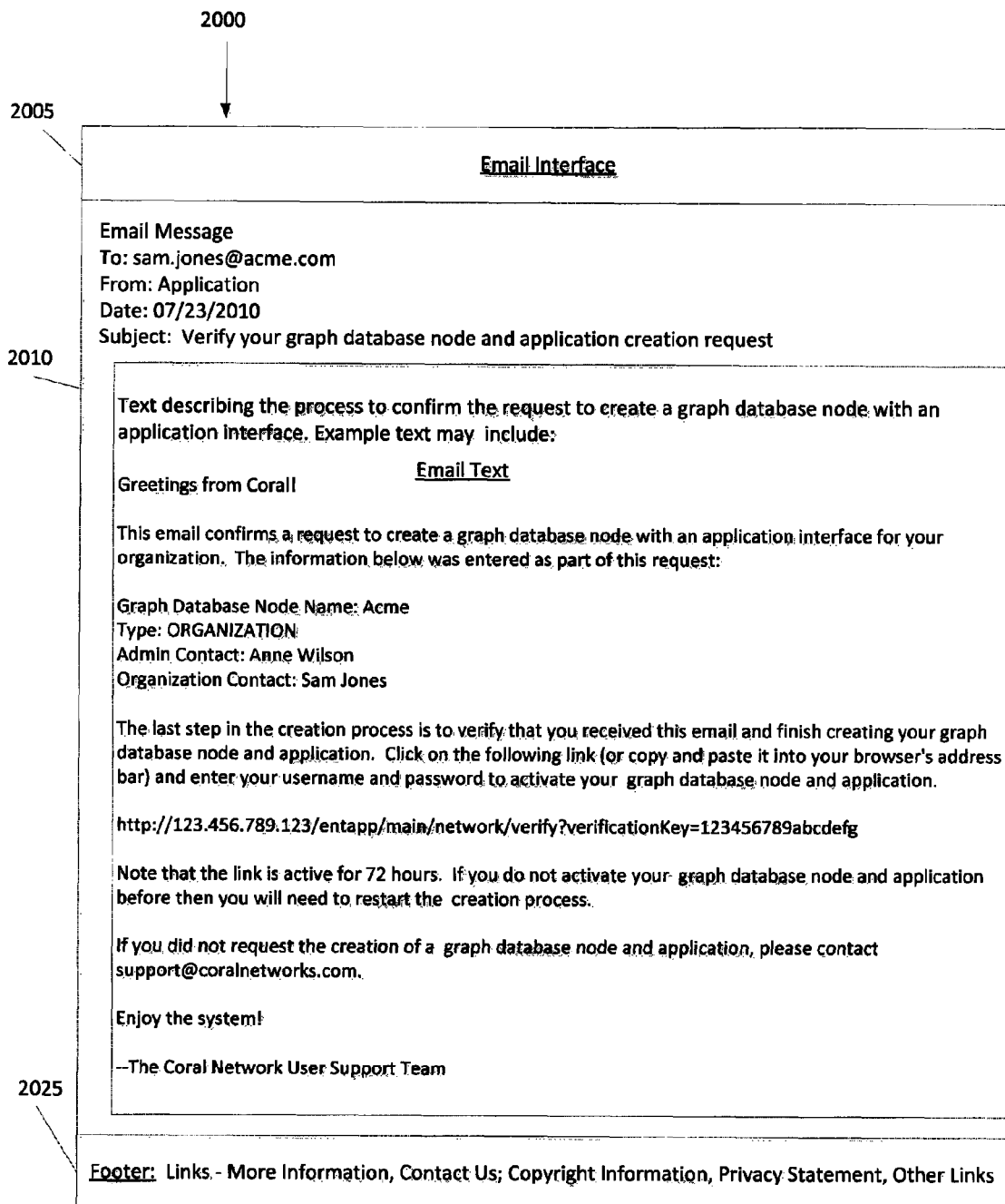
Figure 20. Create Graph Database Node – Email with Instructions to Verify Creation Request

2100

2105

Header section: Logo, Company or Organization Name, Tag Line, Links
[GC] | Help

2110

Menu / Navigation Bar:                My Graph Database Nodes | Feedback | Logout Body        Verify Graph Database Node and Application Creation Request

2115

Enter your user name, password and verification code to
verify your creation request.

Username: _____
Password: _____
Verification Key: _____

Verify    Cancel

2120

Footer: Links - More Information, Contact Us; Logged in as : sam.jones;
Copyright Information, Privacy Statement, Other Links Figure 21. Create Greaph Database Node – Verify Creation Request Page

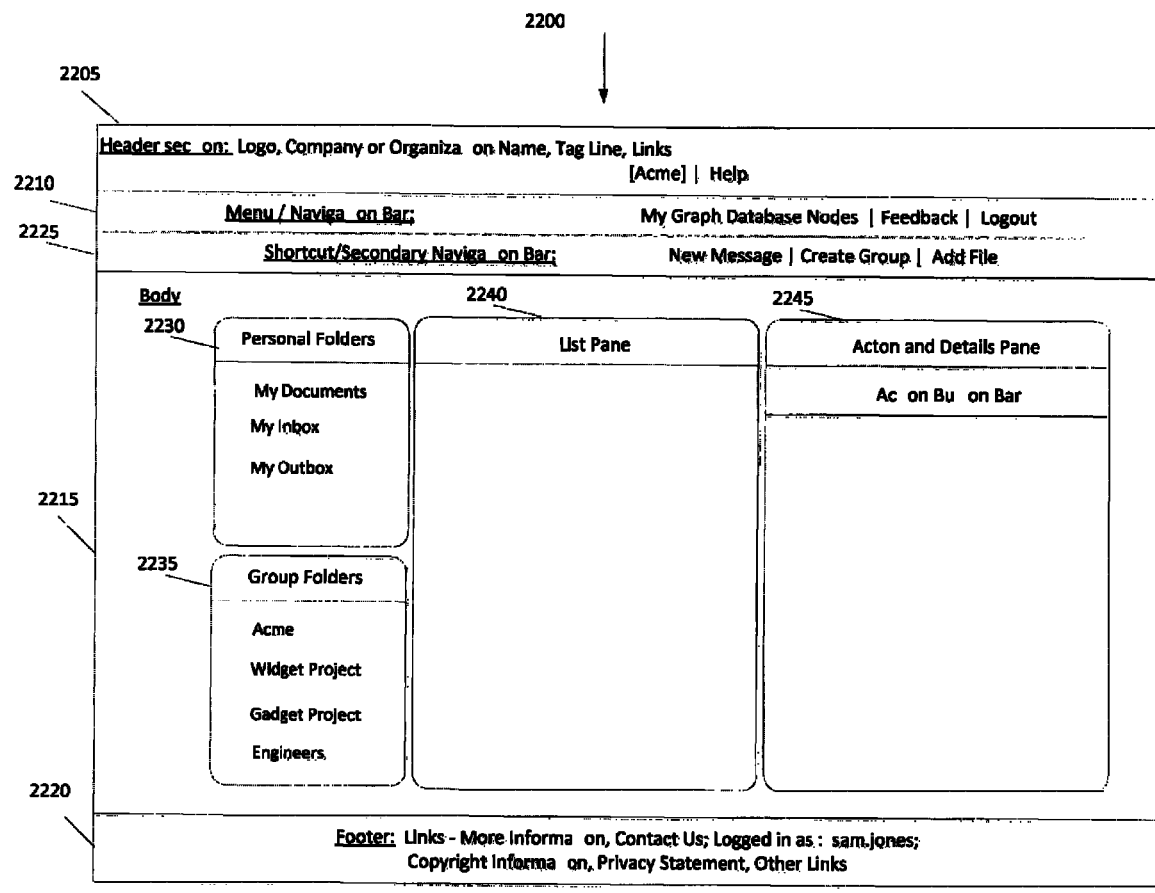
Figure 22. Graph Database Node Application Home Page

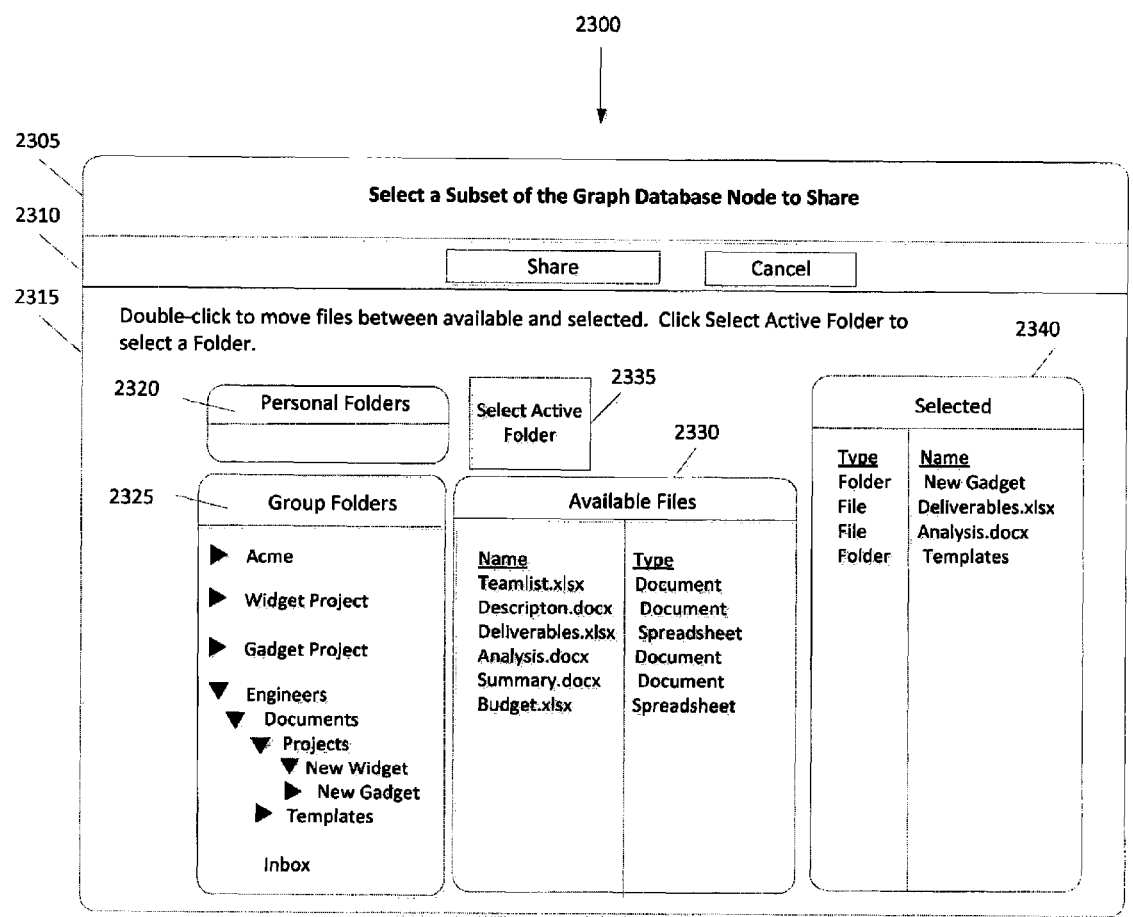
Figure 23. Select a Subset of the Graph Database Node to Share

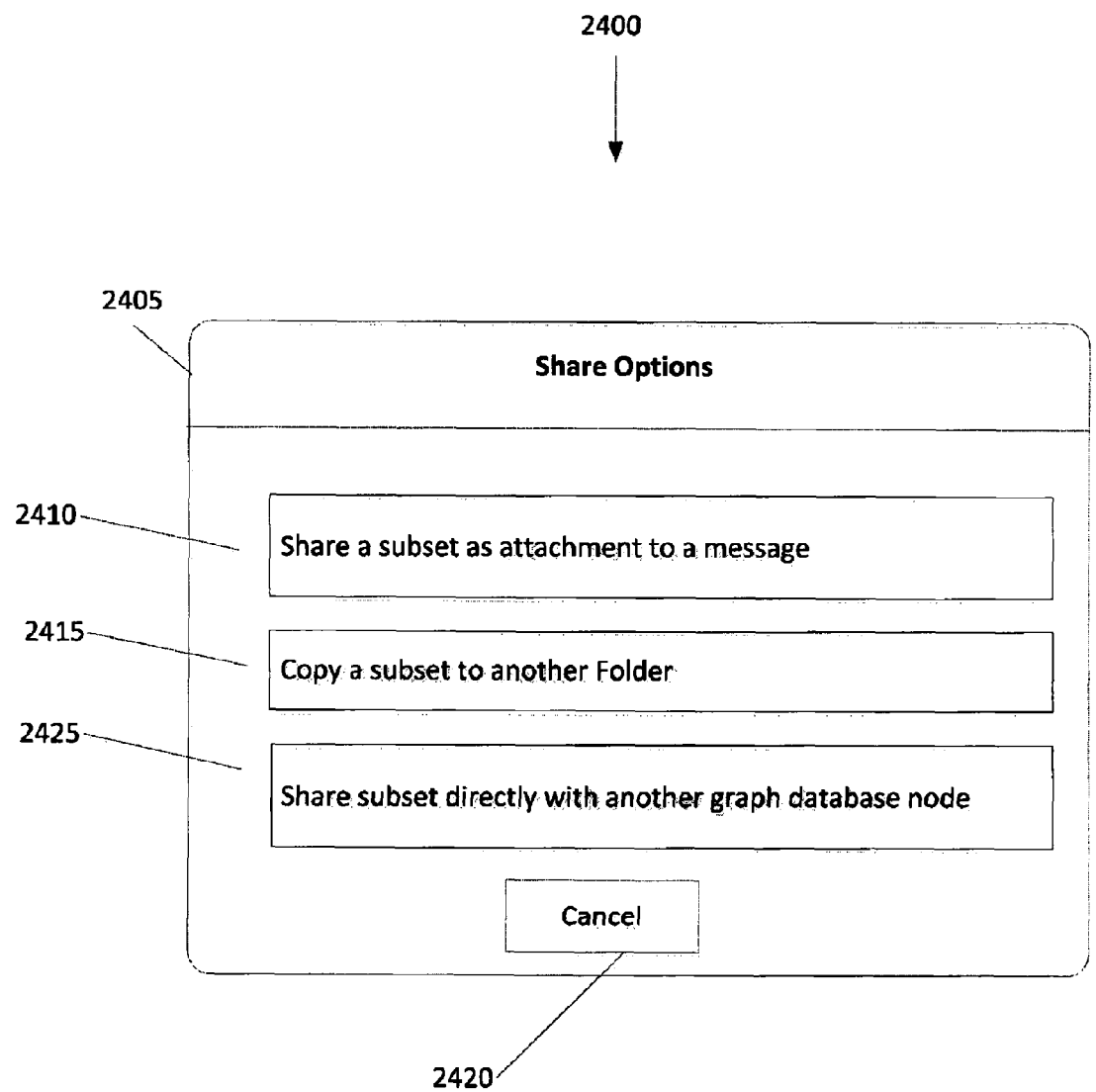
Figure 24. Options to Share a Subset of a Graph Database Node Popup

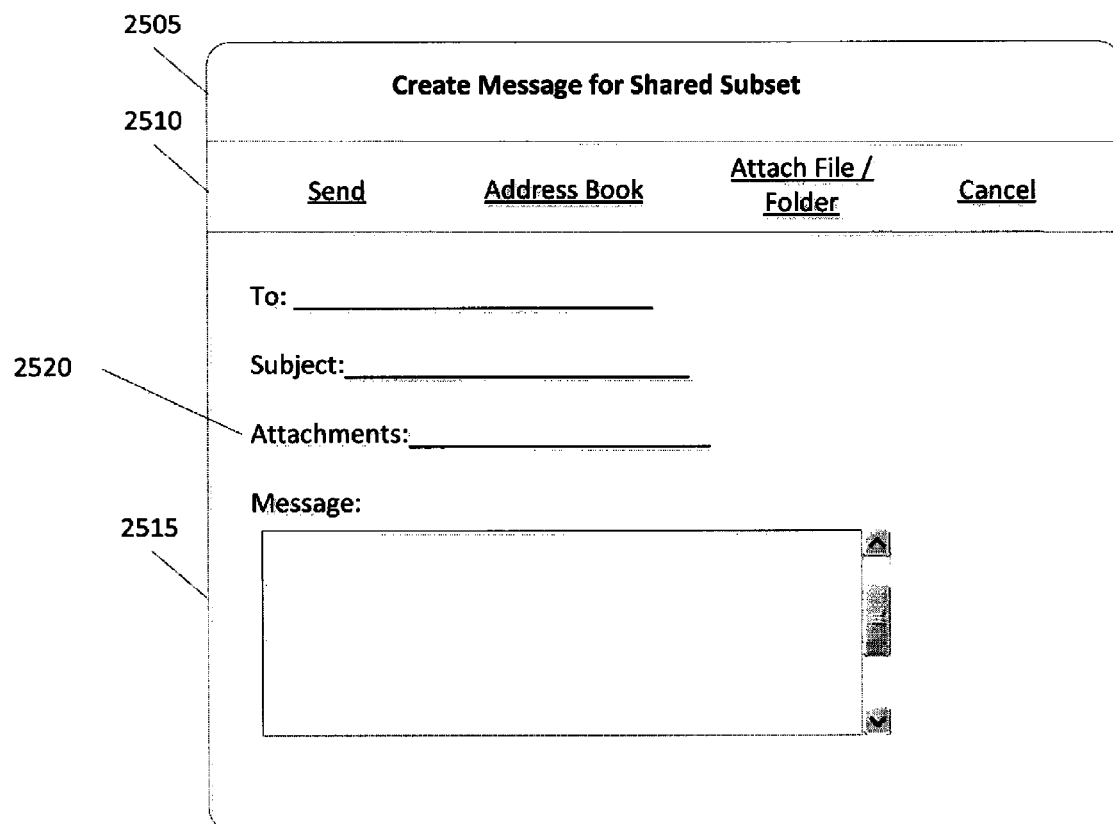
Figure 25. Create Message for Shared Subset

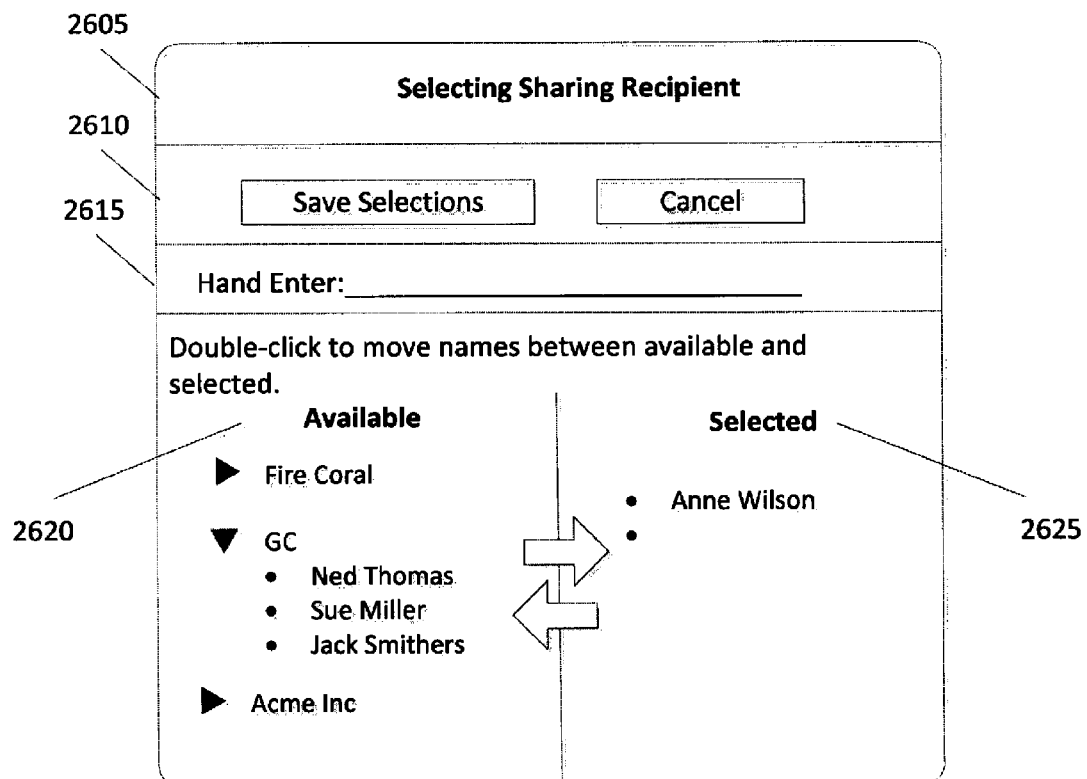
Figure 26. Select Sharing Recipient

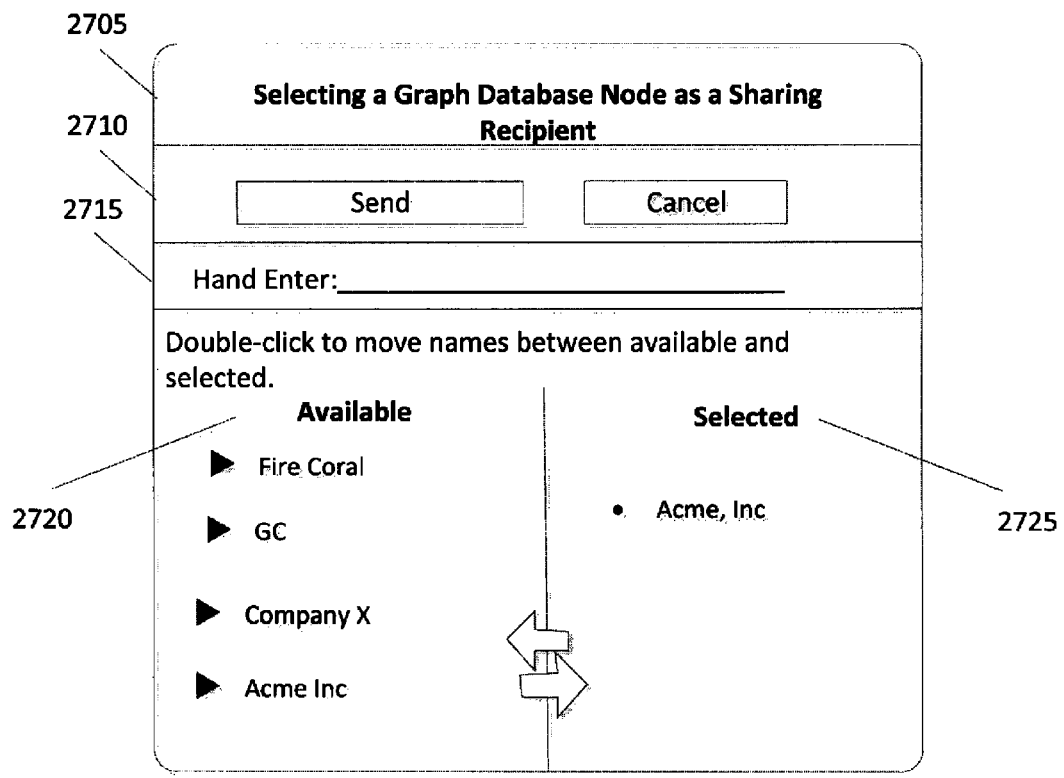
Figure 27. Select a Graph Database Node as a Sharing Recipient

SYSTEM AND METHOD FOR CREATING, DEPLOYING, INTEGRATING, AND DISTRIBUTING NODES IN A GRID OF DISTRIBUTED GRAPH DATABASES

CROSS-REFERENCE TO RELATED APPLICATIONS

This application claims priority and benefit of U.S. Provisional Application No. 61/428,553 filed on Dec. 30, 2010, entitled SYSTEM AND METHOD FOR CREATING, DEPLOYING, INTEGRATING, AND DISTRIBUTING NODES IN A GRID OF DISTRIBUTED GRAPH DATABASES the disclosure of which is incorporated herein in its entirety.

This application is also generally related to U.S. application Ser. No. 12/714,094 and is also generally related to U.S. application Ser. No. 13/155,601, and is also generally related to U.S. patent application Ser. No. 13/020,531, and is also generally related to U.S. patent application Ser. No. 13/163,634.

BACKGROUND 1.0. Field of the Invention

The invention relates generally to information processing technology and, more specifically, to a system and method that generally provides for creation of a distributed graph database, creation and deployment of nodes in a distributed graph database system, and integration of nodes into a set of distributed graph databases.

2.0. Related Art

Graph database systems of today, before this disclosure, do not typically allow businesses or organizations to seamlessly move information between Cloud environments, between Cloud and non-Cloud environments, and between multiple non-Cloud environments, such as behind a firewall or on organization-maintained servers.

Todays' graph databases, before this disclosure, cannot typically be distributed in an efficiently synchronizable manner. Data in the previous graph databases may be replicated to many different systems, many different instances, and multiple server environments. However, data changes on one or more graph databases are nearly impossible to capture and push to all other nodes without other changes occurring before the updates are completed, frequently resulting in orphaned data, conflicting data, and synchronization problems. Reconciling data typically requires stoppage of the systems and/or development of additional software. Each graph database with replicated information is essentially isolated from the other graph databases. Data may be exchanged between graph databases through a tedious process of preparing mutually agreeable XML schema, converting the data to be shared to XML format, writing web services, SOAP and REST protocols to manage the exchange process, agreeing on authentication and authorization protocols, parsing the XML on the receiving database, deconflicting the transferred data and the receiving data, and inserting the data into the receiving database. Data may be synchronized for a few key data elements, but these typically must be carefully selected and explicitly designed around. Reconciling the transferred data and using the transferred data to synchronize the information available for any data element in common between the receiving database and the transferred data is virtually impossible. If the data are changed in one of the sets, it may no longer be identifiable as the same data and is not synchronizable, Today's systems do not contain information needed to synchronize the entire data set, specific data elements must be selected for synchronization and static processes requiring significant resources to define and implement must be prepared. It is virtually impossible and prohibitively expensive to synchronize entire data sets across tens, hundreds, or more graph databases with today's systems before this disclosure.

Graph database systems of today, before this disclosure, do not typically provide for the dichotomy of business: the need to share data and the need to keep data separate. Systems before the disclosure do not leverage a combination of immutability and relationships to allow information distributed across a set of graph database nodes to cooperatively converge, creating cooperative advantage, and competitively diverge, creating competitive advantage, while at the same time maintaining the immutability and convergeability of the total data set.

Today's graph databases are typically limited by one or more of the following, among other limitations:

Static and constrained information representations: each graph database may operate on a constrained set of information that is force-fit into a static representation that once defined, cannot be readily changed;

Location and format/lack of interoperability: some of the data needed to properly complete an analysis or create a report may be collected by a different graph database, may be in a different format or organized differently, or may be in a different location. Data cannot be easily shared between graph databases, a convoluted set of formatting, transfer, parsing, and reformatting procedures must be programmed to enable sharing;

Limited ability to represent and adapt to changing information structures: information representations must be fully defined prior to developing graph databases for which data exchange may be desired. If a change to a data structure or format is required, the receiving graph database cannot be easily adjusted when real-world changes to the information representation become apparent;

Lack of support for creating networks of graph databases that include multiple distributed graph database nodes that can be selectively or entirely synchronized.

Automating creation, distribution, and integration of fully functioning graph database nodes into a network of graph databases such that any of the graph database nodes in a graph database network may communicate reliably and transparently with any other graph database node in the graph database network.

Sending a subset or the full set of data from a sending graph database node to one or more receiving graph database nodes and immediately merging the data into the receiving graph database nodes though a union operation rather than writing additional software to extract, package, move, parse, and deconflict the data according to a predefined schema, for example.

Expanding and distributing a network containing a virtually unlimited set of graph database nodes;

Decomposing any graph database node into multiple child graph database nodes so that a hierarchy of graph database nodes including parent/child characteristics, streamlined sharing processes, peering, and other shared processes may be created;

Multi-parenting of child graph database nodes so that the child may be readily accessed by any of the multiple parent graph database nodes;

Changing the parent of a graph database node so that the structure and content of a graph database node may be changed, such as for a corporate merger operation, but be linked to the new parent;

Creating a multiplicity of networks of graph database nodes so that virtual private internets may be implemented;

Merging one or more networks of graph database nodes with one or more other networks of graph database nodes;

Creating a graph of networks or graph database nodes.

SUMMARY OF THE DISCLOSURE

The principles of this present disclosure satisfies the above needs and overcomes the drawbacks of the prior art by providing for a computer environment, a mechanism for creating a distributed graph database, creating nodes in a distributed graph database, integrating nodes in a distributed graph database, and deploying nodes in a distributed graph database. The present disclosure provides for, but is not limited to, at least one or more of the following features:

Creating networks of graph databases that are sets of distributed graph database nodes. This may be useful, for example, to organizations that require loose coupling of information sets, such as intelligence agencies. These organizations may require separate graph database nodes for each division headquarters, separate graph database nodes for each domestic regional office, separate graph database nodes each international location, separate graph database nodes for high-concern threats, and separate graph database nodes for specific agents. Integrating these distributed nodes into one or more graph networks may facilitate information sharing and loose synchronization of information across the set of distributed networks.

Organizing and integrating graph database nodes in a graph database network in which the graph database nodes can communicate reliably and transparently with one another. As described in the previous example for intelligence agencies, integrating the distributed graph database nodes configured according the principles of the disclosure into networks of graph databases may facilitate information sharing and loose synchronization of information across the set of distributed networks. Continuing the example, suppose multiple agencies have information about the same threat. The information linked to data nodes specific to the threat may be readily shared across the distributed graph database nodes or GraphNets by selecting from one or more of the graph database node the subset that includes the linked information and sharing the selected subset with one or more graph database nodes and merging through a simple union operation.

Sending data from one graph database node to one or more receiving graph database nodes and immediately merging the data automatically into the receiving graph database nodes without the need to write additional software to extract, package, move, and parse the data according to a predefined schema. This may result in easy sharing of a subset of or an entire graph database node with another graph database node, including packaging, and forwarding; and merging. Each GraphDBN configured according to the principles of the disclosure contains at least a graph database that includes nodes and edges. When sharing, the graph of the information to be shared may typically be shared. Because the recipient Graph-DBN or GraphNet is itself a graph, including nodes and edges, the shared graph may be added to the recipient graph by simply inserting any new nodes and edges that may not already be contained in the recipient Graph-DBN or GraphNet through a union operation. Using an approach configured according to the principles of the disclosure, there may not be a need to: predefine schemas using XML or another information sharing specification, write web services to manage the transfer of the information. Additionally, there may not be a need to develop software code or buy software applications for complex extract, transform, and load (ETL) processes to select and package and/or merge the information as may typically be required for today's systems before the invention.

Expanding and distributing a network containing a virtually unlimited set of graph database nodes. For example, this aspect may be useful for large retailers that may be constantly adding new suppliers of new or existing items sold by the retailer. Continuing the example, new graph database nodes may be added to a GraphNet operated by the retailer for new suppliers at any time.

Automating creation, distribution, and integration of fully functioning graph database nodes into a network of graph databases. Continuing the previous example, if the retailer uses an automated process for creation, distribution, and integration of new graph database nodes into its GraphNet, the new supplier may be up and running in minutes or hours rather than weeks or months as is typical with today's systems before the invention.

Decomposing any graph database node into multiple child graph database nodes and creating a hierarchy of graph database node through parent/child characteristics. For example, one GraphDBN may be split into multiple GraphDBNs, which may be useful to companies with many offices or organization units, and companies that would like to quickly create a supplier network.

Multi-parenting of graph database node. For example, two companies may participate in a joint venture, such as building and operating a wind farm. The two companies can multi-parent a GraphDBN for the windfarm project.

Changing the parent of a graph database node. For example, suppose 'Acme Inc.' stores all of its processing, supplier, client, sales, staff, and other business information for its 'Toothpaste Division' in a graph database node configured according to the principles of the disclosure. Suppose further that 'World Teeth Inc.' operates a different graph database node and the 'Toothpaste Division' of 'Acme Inc.' is acquired by 'World Teeth Inc.'. Continuing the example, the parent of the 'Toothpaste Division' graph database node may be updated to 'World Teeth Inc.', which may result in a merge of the 'Toothpaste Division' graph database node with the 'World Teeth Inc.' graph database node.

Creating a multiplicity of networks of graph database nodes. This may be useful for systems such as health care information exchanges where loosely coupled hospital networks may include a separate graph database node for each hospital but the network in which the hospital graph database nodes participate and share information may be run by a regional group. For example, the 'North Eastern Hospital GraphNet' may include a separate graph database nodes for each member hospital, and the 'South Eastern Hospital GraphNet' may include a separate graph database node for each of its member hospitals.

Merging one or more networks of graph database nodes with one or more other networks of graph database nodes. For example, a regional reorganization may result in a 'North Eastern Hospital GraphNet' that includes a separate graph database nodes for each member hospital and a 'South Eastern Hospital GraphNet' GraphNet' that may include a separate graph database node for each of its member hospitals may merge into a single 'Eastern Hospital GraphNet'.

In one aspect, a computer-based network system includes a plurality of graph database nodes so that any subset of information contained in any of the plurality of graph database nodes is shareable with any other graph database node in the network system using a merge operation, wherein the plurality of graph database nodes comprises at least two data nodes and at least one edge linking the at least two data nodes, the subset of information also comprises at least one data node, the at least one data node contains immutable data so that the at least one data node is evolvable through the addition of at least one new edge that is also a data node, and the at least one new edge links at least one data node to at least one other data node so that the integrity of the at least one data node, the at least one other data node, and the at least one edge is maintainable during sharing and merging of the subset of information throughout the plurality of graph database nodes, whereby the any of the plurality of graph database nodes data nodes and the any other graph database node is at least partially synchronizable.

In another aspect, a computer-implemented method for networking graph database nodes, including the steps of creating two or more graph database nodes, each graph database node containing at least two data nodes and one edge linking the two data nodes, the two or more graph database nodes configured so that an entire graph database node or any subset of information contained in any one of the two or more graph database nodes is shareable and mergeable, sharing a subset of information contained in any one of the two or more graph database nodes with any other graph database node in a network of graph database nodes, and merging the subset of information contained in any one of the two or more graph database nodes with any other graph database node in the network so that the content of the any other graph database node is at least partially synchronized with the content of the any one of the two or more graph databases and made available substantially immediately to the any other graph database in the network of graph databases.

In another aspect, a computer-implemented method for creating, deploying, and integrating graph database nodes in a distributed graph database network, the method including the steps of creating in a computer system a first graph database node having a first set of data nodes, each first set of data nodes having an identifier and a first set of edges linking at least two of the first set of data nodes, creating in a computer system a second graph database node having a second set of data nodes, each second set of data nodes having an identifier and a second set of edges linking at least two of the second set of data nodes and sharing a first subset of the first graph database node with the second graph database node, wherein the shared first subset is merged into the second graph database, at least partially synchronizing the first graph database node and the second graph database node so that substantially similar information is available to users of the first graph database node and the second graph database node and distributed collaboration on the first subset occurs as new data nodes are created and linked to the first subset through addition of new edges, thereby independently expanding and evolving a set of information linked to the shared first shared subset so that the set of data nodes added to the first graph database and linked to the first shared subset are selectively shared with the second graph database, and the set of data nodes added to the second graph database and linked to the first shared subset are selectively shared with the first graph database.

In another aspect, a computer program product for creating a network of distributed graph database nodes embodied as computer logic in a computer storage medium that when read and executed by a processor performs the steps of creating a parent graph database node having a first set of data nodes, each having an identifier, a first set of edges linking at least two of the first set of data nodes, and a first routing name and decomposing the first graph database node into at least one child graph database nodes having a second set of data nodes, each having an identifier, a second set of edges linking at least two of the second set of data nodes, and a second routing name, wherein the at least one child graph database node inherits subsets of the parent graph database node.

In another aspect, a computer network comprising a Graph Database Network arranged so that it is decomposable into a plurality of graph database nodes linked to each other through the graph.

In another aspect, a computer network comprising distributed graph database networks, each graph database network comprising a plurality of graph database nodes containing immutable data, the plurality of graph database nodes linked to each other through edges so that the graph database network is expandable through the linking in of new edges, new data nodes, or new graph database nodes.

In another aspect, a graph database network system comprising a plurality of graph database nodes wherein any graph database nodes comprises a collection of child graph database nodes wherein the collection of child graph database nodes are distributable across at least one virtual or physical server, and wherein any edges joining the graph database nodes are maintainable across the at least one virtual or physical servers.

BRIEF DESCRIPTION OF THE DRAWINGS

The accompanying drawings, which are included to provide a further understanding of the invention, are incorporated in and constitute a part of this specification, illustrate aspects of the invention and together with the detailed description serve to explain the principles of the invention. No attempt is made to show structural details of the invention in more detail than may be necessary for a fundamental understanding of the invention and the various ways in which it may be practiced. In the drawings:

FIG. 1 is an exemplary block diagram of an architecture of a Grid of Graph Databases configured according to the principles of the disclosure;

FIG. 2 is an exemplary block diagram of an architecture of an Expanded Grid of Graph Databases, configured according to the principles of the disclosure;

FIG. 3 is an exemplary block diagram of Forms, Relations, and Corresponding Relations, configured according to the principles of the disclosure;

FIG. 4 is an exemplary block diagram of a Relation Form, configured according to the principles of the disclosure;

FIG. 5 is an exemplary block diagram of a Name Relation Form with Left Side Relation and Right Side Relation, configured according to the principles of the disclosure;

FIG. 6 is an exemplary block diagram of a Relationship Entity Signifying Change to a Relation, configured according to the principles of the disclosure;

FIG. 7 is an exemplary block diagram of a Simplified Example of a Substitution Relationship, configured according to the principles of the disclosure;

FIG. 8 is an exemplary flow diagram of a process for sharing and merging a subset of a source graph database node with a recipient graph database node, configured according to the principles of the disclosure;

FIG. 9 is an exemplary flow diagram of a process for creating, deploying, and integrating a new GraphDBN in a GraphNet, the steps performed according to the principles of the disclosure;

FIG. 10 is an exemplary flow diagram of a process for creating, deploying, and integrating a new GraphDBN in a loosely coupleable configuration, the steps performed according to the principles of the disclosure;

FIG. 11 is an exemplary flow diagram of another process for Creating, Deploying, and Integrating a new GraphDBN in a loosely coupleable configuration, the steps performed according to the principles of the disclosure;

FIG. 12 is an exemplary block diagram of a GraphNet architecture, configured according to the principles of the disclosure;

FIG. 13 is an exemplary block diagram of an expanded GraphNet architecture, configured according to the principles of the disclosure;

FIG. 14 is an illustration of an exemplary Login page for an application interfacing with at least one graph database node, configured according to the principles of the disclosure;

FIG. 15 is an illustration of an exemplary My Graph Database Node(s) page for an application interfacing with at least one graph database node, configured according to the principles of the disclosure;

FIG. 16 is an illustration of an exemplary Create Graph Database Node—Enter Name and Description page for an application interfacing with at least one graph database node, configured according to the principles of the disclosure;

FIG. 17 is an illustration of an exemplary Create Graph Database Node—Enter Contact and Security Information page for an application interfacing with at least one graph database node, configured according to the principles of the disclosure;

FIG. 18 is an illustration of an exemplary Create Graph Database Node—License, Terms, and Conditions of Use page for an application interfacing with at least one graph database node, configured according to the principles of the disclosure;

FIG. 19 is an illustration of an exemplary Create Graph Database Node—Confirm Information page for an application interfacing with at least one graph database node, configured according to the principles of the disclosure;

FIG. 20 is an illustration of an exemplary Create Graph Database Node—Email with Instructions to Verify Creation Request page, configured according to the principles of the disclosure;

FIG. 21 is an illustration of an exemplary Create Graph Database Node—Verify Creation Request page for an application interfacing with at least one graph database node, configured according to the principles of the disclosure;

FIG. 22 is an illustration of an exemplary Graph Database Node Home page for an application interfacing with at least one graph database node, configured according to the principles of the disclosure;

FIG. 23 is an illustration of an exemplary Select a Subset of a Graph Database Node to Share popup for an application interfacing with at least one graph database node, configured according to the principles of the disclosure;

FIG. 24 is an illustration of an exemplary Options to Share a Subset of a Graph Database Node popup for an application interfacing with at least one graph database node, configured according to the principles of the disclosure;

FIG. 25 is an illustration of an exemplary Create Message for Sharing a Subset popup for an application interfacing with at least one graph database node, configured according to the principles of the disclosure;

FIG. 26 is an illustration of an exemplary Select Subset Recipient Popup for an application interfacing with at least one graph database node, configured according to the principles of the disclosure; and FIG. 27 is an illustration of an exemplary Select a Graph Database Node as a Sharing Recipient popup for an application interfacing with at least one graph database node, configured according to the principles of the disclosure.

DETAILED DESCRIPTION OF THE DISCLOSURE

The various aspects of the disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the various examples of the invention. The examples used herein are intended merely to facilitate an understanding of ways in which the invention may be practiced and to further enable those of skill in the art to practice the various aspects of the invention. Accordingly, the examples herein should not be construed as limiting the scope of the invention, which is defined solely by the appended claims and applicable law. Moreover, it is noted that like reference numerals represent similar parts throughout the several views of the drawings.

It is understood that the invention is not limited to the particular methodology, protocols, devices, apparatus, materials, applications, etc., described herein, as these may vary. It is also to be understood that the terminology used herein is used for the purpose of describing particular examples only, and is not intended to limit the scope of the invention, unless specifically stated otherwise. It must be noted that as used herein and in the appended claims, the singular forms "a," "an," and "the" include plural reference unless the context clearly dictates otherwise.

A system and method for creating, deploying, and integrating new nodes in a distributed network of graph databases may include defining the structures that may be needed to capture, store, manage, transfer, copy, append, distribute, evolve, diverge, and/or converge information across a distributed set of graph database nodes, or even within a given graph database node. The information may include data elements, connections between data elements, and collections of connected data elements. The constructs that may be needed to model data and the connections between data within a single graph database node or across a distributed set of graph database nodes may be implemented using a computer-based Forms Language. Forms Language may also provide one or more constructs that capture changes to the connections between data as separate objects.

The value of data linkage, or the relations between data, is often underestimated; a link between two data elements may itself be information about the two linked data elements. For example, linking George Washington and the United States in a "President-Country" relation may convey not only that the two are linked in some way, but may also convey the information associated with the President" relation. Further linking George Washington to Martha Custis using a "Spouse" relation provides additional information. Linking George Washington to Boston and Yorktown with the "Battles Won" relation provides even more information. The more links exist between George Washington and other data in a system, the more information is known about George Washington, and reciprocally, the more that is known about the data to which George Washington is linked. Using the computer-based Forms Language as the construct for building a graph database node or a set of graph database nodes, the usefulness of data may be increased as its connectivity increases, in other words, the more data are connected to other data, the more information is available as a result of those connections.

Additionally, data nodes such as entities may not be changed (i.e., changed in the sense of traditional systems) in a system configured according to the principles of the disclosure; rather data nodes may evolve as a result of the addition of Relationship Entities, negation of Relationship Entities, or creation of Versions through Substitution Relationship Entities.

Today's systems before this disclosure link data through uncharacterized constructs, such as left joins and right joins and outer joins, or simple pointers between one data field and another data field. The linkages do not provide information about the context of the link; the context must be inferred based on what is being linked, the report that uses the link, the business rules in the query used to create a linkage, and the like. In a system configured according to the principles of this disclosure, links are objects themselves and have their own relations, allowing for a robust set of descriptive relations to be included as part of the link itself so that a link can add to the information set through the information it contains, and possibly linking the link to other entities or links, expanding the graph database and its corresponding information web organically. Because data nodes is a system configured according to the principles of the disclosure contain immutable data, the information represented in a graph database may only be expanded. Therefore, information may not be lost over time. Configuring links in a graph database as entities that have immutable data and that may also contain relations provides for more robust and more information dense linkages than may be possible in previous systems. The immutable, robust, information dense linkages may be used to create distributed networks of linked graph database nodes that can be efficiently synchronized in part or in whole. This synchronization may be possible by performing a simple union of the sets to be merged with logic that determines whether an entity to be merged is already contained in the target graph database node and may add the data node if it is not already contained, and may skip adding the data node if it already exists. In this way, data nodes, including but not limited to that are objects, entities, relations, relationships, and the like, may be merged using union operations without worry of conflict, including data nodes that are objects, entities, relations, relationships, and the like.

The structures and constructs that may be building blocks of one implementation of a system and method for a computer-based Forms Language, may include but are not limited to the following:

The Forms Language
Forms
Relations
Entities
Relationships

DEFINITIONS

Definitions for terms used to describe aspects of one implementation of the computer-based system and method for creating, deploying, and integrating new nodes in a distributed network of graph databases are provided below:

Graph Database (GraphDB): A collection of information that may be modeled as objects (data nodes) and may be joined by relationships (edges).

Graph Data Node (GraphDN): An object in a graph database. A graph data node may be defined by a Form, and may be an Entity. Also referred to as a data node.

Graph Database Node (GraphDBN): An instance of a graph database.

Edge: The link between two GraphDNs or two GraphDBNs that may be expressed as a data node. An edge may be defined by a Form and may be an Entity.

GraphNet: A distributed Graph Computing Network in which one or a plurality of GraphDBNs that may be connected by edges may be deployed on one or a plurality of physical or virtual machines.

Network: The name of the organization or collaboration that may be associated with a graph database node. The name may typically be specified by the user that initiated creation of the GraphDBN.

Distributed Graph: a graph that may be spread across more than one of any type of electronic infrastructure and may be inter-connected via a communications channel and/or communications protocol. The electronic infrastructure may include, but is not limited to: virtual machines, physical servers, other computer servers, electronic devices (e.g., smart phones, tablet computers, desktop computers, laptop computers, netbooks, and the like), or other computing devices.

Distributed Grid Infrastructure: A collection that may include at least two of any combination of the following: virtual servers, physical servers, or electronic devices.

Information Graph: a web of interconnected data that may be comprised of a collection of data nodes that may be connected by relationships.

Cloud: The set of computer servers and associated hardware infrastructure that may be accessible through the internet that an organization may operate on its own (private Cloud) or operated by third parties (Commercial Cloud) which may offer on an as-needed basis the virtual space and computing resources, operational support, and other services to organizations or individuals on a commercial or free basis. Cloud operators, private or public, may also offer service level agreements guaranteeing a certain percentage of time of availability of the servers, resources, and associated hardware infrastructure. It is possible that an entirely independent network other than the Internet might be employed to provide a Cloud.

Virtual Private Graph (VPG): a GraphNet that may include one or more GraphDBNs that may be deployed on the public internet, in a Cloud environment, behind a company firewall, or through some other communication infrastructure. The VPG may be secured in such a way that it may not be discoverable and may only be accessed by actors with the exact address and valid authentication credentials; and for which the communications between the GraphDBNs, as well as between clients and the GraphDBNs, may be encapsulated and/or encrypted. For example, each GraphDBN in a GraphNet may be accessed by users through a VPN tunnel.

Private Internet: A propagation of the private graph database nodes, graph computing environment, and software configured according to the principles of the disclosure in a virtual environment, on dedicated physical hardware, or any combination of virtual environments and dedicated physical hardware, in which at least two of the GraphDBNs may directly connect to one another for purposes of exchanging information. The private internet may be co-resident on the same hardware as the current internet, or on a separate infrastructure. The private internet may only be accessible to actors:

with proper authentication credentials;
to which the electronic means of access, such as a web address or other electronic address, are known;
which have been granted access controls through the graph computing environment;
And for which access controls are stored in the graph comprising the private internet.

Actor: any internal or external agent to the system that may be capable of providing inputs, submitting requests, or operating on a system object. Examples of actors in a system may include but are not limited to: users, groups, and functions.

Form: A Form may be a construct that may be used to model objects in databases, configured according to the principles of the disclosure. A Form may be a collection of Relations, and Relations may also be defined by Forms. A Form may also define the immutable properties of a data node. For example, a system may include two Forms: A "Person" Form and a "Company" Form. The "Person" Form may contain a "Name" Relation to link a name with the person. A "Company" Form may contain two relations: a "Name" Relation to link a name with a company and an "Employee" Relation to link multiple "Person" Forms to the "Company" Form. A Form may model essentially anything tangible and/or anything intangible.

Relation: A link between two or more Forms. A Relation may act as a Function that may join a Form on one side (e.g., the input Form, or left Form) to a Form in the other side (e.g., the output Form, or right Form). For example, a system may include three Forms: A "Person" Form, a "Name" Form, and a "Company" Form.

The "Person" Form may contain a "Name" Relation to link a name with a person. The "Name" Relation may act as a Function, joining the "Person" Form on one side (as the left side Relation on the Name Relation) with a "Name" Property Relationship Form (as the right side Relation on the Name Relation). The Name Property Relationship Form would link to another Form, such as a string primitive Form, that may store the name to be associated with the Person Form.

Similarly, a "Company" Form may also contain a "Name" Relation to link a name with a company though a "Company Name" Property Relationship Form and another Form, such as a string primitive Form, that may store the name to be associated with the Person Form.

Additionally, the Company" Form may include an "Employee" Relation to link "Person" Forms to a "Company" Form through an Containment Relationship Form.

The phrase "left Form", the phrase "right Form", the phrase "left side Relation", and the phrase "right side Relation" used in this disclosure (including the claims) are names given to the respective logical objects associated with a relation Form and are not meant to refer to an actual specific physical limitation or a specific physical arrangement; the terms are simply names for the respective logical objects to permit improved explanation/description of the relation Form.

Entity: A concrete instance of a Form. For example, a Form and the associated relations used to describe a Company and its properties, respectively, may become an Entity when it is instantiated and a GUID (globally unique identifier) is assigned. After instantiation, a name, such as "Acme, Inc.", may be associated with the "Company" Entity through the "Name" Relation and the "Name" Relationship. Each entity may include immutable data that may not be changed, such as the entity GUID which may be an identifier and a date/timestamp. The immutable data of an entity may provide a basis for knowing the state of the computer-based network system at any point in time. Typically, each invariant relation is represented by immutable data field belonging to the entity. Anytime a new link is created between entities, a relationship may be created to reflect that the new link may signify one or more changes to the entities being linked.

Relationship: An edge that may link at least two data nodes or may link at least two entities. A relationship may also be an Entity and may signify change to at least one or more of the linked, or referenced entities. For example, a system may include three Entities: A "Joe" Entity, a "Mary" Entity, and an "Acme, Inc." Entity. The "Acme, Inc." Entity may contain an "Employee" Relation that may link the "Joe" Entity and the "Mary" Entity to the "Acme, Inc." Entity through a Containment Relationship Entity. A Relationship may also be defined by a Form.

Object: As understood by one of ordinary skill in art, an object may be a data structure used in programming that may include attributes to define its properties, methods to define its state, and methods to define operations that it may perform or that may be performed on it.

Instantiate: As understood by one of ordinary skill in the art, to instantiate may be to create a "concrete" instance of an abstract object (e.g., in computer's transient memory or in a computer's physical storage layer). In the Forms Language, a Form may be instantiated when an Entity defined by a specific Form is created.

Exemplary Architectures Configured According to Principles of the Disclosure

FIG. 1 and FIG. 2 are each an illustrative block diagram of exemplary architectures, configured according to principles of the disclosure. The systems shown in these Figures are exemplary and may take on different architectures as one of ordinary skill in the art may recognize.

These exemplary FIGS. 1 and 2 show the use of servers, virtual machines, and nodes connected in a distributed system. As one of ordinary skill in the art may recognize, a server may typically include a physical device with, for example: one or more hard drives that may provide a storage medium for electronic data; random access memory (RAM) for holding information that may be needed to execute computer programs and their instructions; a processor that may execute the various computer programs and their instructions; various connection points for input/output, multimedia devices, other peripheral devices, and communications with other servers; and a motherboard, may also be referred to as a circuit board, that may connect and may provide power to the server components. A server may host zero, one, or multiple virtual machines.

The terms "virtual machine" and "virtual server" refers to a collection of software that may be required to execute and run programs on a physical server. A virtual server may share the memory and storage resources of the physical server on which it resides with other virtual machines or other installed software, or the virtual server may be specifically allocated memory and storage resources that cannot be accessed by other software on the same physical server.

FIG. 1 is a block diagram showing an exemplary architecture of an illustrative system configured according to the principles of the disclosure, generally denoted by 100. The example environment shown in FIG. 1 may include the following:

- User Devices (105, 110, 115): electronic equipment capable of accessing the server computer that contains the graph database node(s).
- Server Computers (120): Physical or virtual machines configured to operate a computer system.
- Web Server (125): In general, may receive requests such as HTTP requests (for example), typically from an internet browser, and may forward those requests to the Application Server, and may deliver the response to the internet browser in the form of a web page.
- Application server (130): May typically interpret HTTP requests (or similar requests) and may perform processes and operations required to respond to the request. May forward the response to the request to the web server. The application
- Target application using a graph database node (135): Software that may typically be accessed and run using an internet browser.
- Graph Database Node (GraphDBN) (140): A construct that may store in a graph node configuration structured and unstructured data collected by or associated with the target application. Other implementations may store the graph database node on a separate physical or virtual server.

In the example architecture shown in FIG. 1, a server (120) may host an application, such as a Java® application, that may incorporate the operational logic for target application using a graph database node (135), and may be deployed using a web server (125) that may be accessible through the internet. The application may be employed inside of an application server (130) such as Apache Tomcat™, for example. The application may use a Java Database Connector (JDBC) to connect to a remote or embedded collection of data (140) that may be configured as a graph database node. The data may be persisted from the graph database configuration into a format including but not limited to a database such as Oracle's MySQL®, a key-value database, object-oriented database, graph database, or may directly interact with a text file, or other collections of data. The data collection provides storage and retrieval of the data for or to the application. The application server (130), such as Apache Tomcat™, may also connect to a web server (125) such as Apache HTTP Server®. A user device (105, 110, 115) may access the application with a software tool or similar utility capable of communicating with the web server (125). The tool may include, for example, an internet browser, such as Mozilla's Firefox® or Microsoft Internet Explorer® and connecting to the application via a Uniform Resource Locator (URL). The requests are received by the web server (125) and immediately passed to the application server (130) for processing by the application (135).

A "server" such as shown in FIG. 1 and FIG. 2 may indicate a virtual server, virtual machine, physical server, physical machine, electronic device, program, or programming environment capable of running a system or part of a system configured according to the principles of the disclosure.

FIG. 2 is a block diagram showing an exemplary architecture of an illustrative system configured according to the principles of the disclosure, generally denoted by 200. The illustrative environment shown in FIG. 2 may include servers, such as physical or virtual machines, organized as a distributed system that may incorporate the use of graph database nodes. The illustrative environment shown in FIG. 2, generally designated by reference numeral 200, may include the following:

- Clients (230a, 230b, 230c, 235a, 235b, 235c, 240a, 240b, 240c, 245a, 245b, 245c, 250a, 250b, 250c) for the servers housing the distributed graph database nodes: interface through which users may access the servers, the information organized as a graph database node, any applications, data, and information that may be stored on those servers for systems configured according the principles of this disclosure. The client interface may be a thin web client, thick web client, desktop interface, command prompt, or another interface type.
- Graph Database Node Servers (205, 210, 215, 220, 225): Servers that may provide a set of applications (e.g., file management, user management, group management, database applications, specialized applications, etc.) operating on the information organized as a graph database node, and may persist and manage data, information, and users.
- Messaging Server (included in 205, 210, 215, 220, 225): May receive, queue, store, manage, and otherwise transact information packets, including but not limited to streams and subsets of a graph database node, being transferred between servers for systems configured according to the principles of the disclosure.

In another implementation, any one or more of the collection of Graph Database Node Servers (205, 210, 215, 220, 225) may act as a central hub for accessing the other nodes. One of ordinary skill in the art may also recognize that any number (greater than zero) of Hub and Servers, Messaging Servers, Graph Database Node Servers, and clients may be implemented in this architecture.

Additionally, the communications protocol shown in this example is internet protocol (IP). One of ordinary skill in the art may recognize that other communications protocols may also be used. The connection protocol communications may be secured through the use of firewall, secure socket layer (SSL) technology Virtual Private Network (VPN), or other security protocols.

A graph database node may be deployed on multiple systems on the Internet on a physical server or virtual server, with or without firewalls, and may connect through another graph database node, or directly to another graph database node such as is common in a peering connection. A collection of linked graph database node may be considered a GraphNet, and may also be referred to a Private Internet, virtual private graph, and the like. One of ordinary skill in the art may recognize that a variety of terms may be used to describe a set of linked, distributed graph database nodes. It is also possible that an entirely independent network other than the Internet might be employed.

Creating, Deploying, Integrating, and Distributing Nodes in a Grid of Distributed Graph Databases In one implementation configured according to the principles of the disclosure, the system and method for creating, deploying, integrating, and distributing nodes in a grid of distributed graph databases may be used to distribute a graph computing environment across an essentially unlimited set of virtual servers, physical servers, and/or electronic devices. The graph computing environment may be implemented using the Forms Language constructs and each data node in the graph database may contain immutable data. Each graph database node in the distributed graph database may parent zero or a multiplicity of child graph database nodes, merge with another graph database node, multi-parent a new graph database node, or change parent graph database node(s).

When deployed in an internet environment, this distributed graph computing environment may be used to create private internets. Each graph database node (GraphDBN) may share a subset or all of its data nodes with any other graph database node (GraphDBN).

The computer-based processes configured according to the principles of the invention may provide for: the creation of new graph data nodes, new graph database nodes (GraphDBNs); addition of the new GraphDBNs to a GraphDB; the creation and management of domain-specific graphs, such as identity graphs, access control graphs, workflow graphs, structured data graphs, unstructured data graphs, other information graphs, and the like for each GraphDBN; the operation of new GraphDBNs; and communications between the GraphDBNs. The GraphDBs and GraphDBNs may combine to form a GraphNet, an electronic infrastructure providing for the creation, deployment, and integration of any type of domain-specific graphs, including but not limited to information graphs and process graphs.

Creating, distributing, and integrating GraphDBNs into a GraphDB, enabling a distributed graph computing environment, and providing for GraphDBN portability may streamline the process of creating a distributed electronic infrastructure for information sharing and storage; for distributed human collaboration, for distributed automated collaboration, for a combination of distributed human and automated collaboration, and other distributed operations. For example, if Company A would like to acquire Company B, business staff may configure the infrastructure for sharing files for acquisition due diligence by legal, accounting, and other organizations in minutes or hours using a system configured according to the principles of the disclosure rather than using the typical methods emailing sensitive files or spending months specifying, configuring, and deploying server infrastructure and software with staff specializing in networking and hardware. In another example, if Organization D wants its suppliers worldwide to participate in a private internet, the distributed infrastructure needed to provide each supplier a child node, and integrate each child with/under the Organization D parent node, and provide for information sharing may be configured in minutes or hour using a system configured according to the principles of the disclosure rather than using typical systems of today which may take months or years to design, specify, acquire, configure, and deploy.

In other implementation of systems configured according to the principles of the disclosure, use of "Cloud" infrastructure to set up, in minutes, multiple GraphDBNs in a distributed graph database network (GraphNet) may be possible. This (GraphNet) may be used to share, store, and organize information and tasks, as well as send messages within and across GraphDBNs.

Moreover, the GraphNet may include computer-based processes that may provide for the selection, packaging, and transferring a subset of or complete graph from one graph database node, and merging the subset or complete graph with the graph on another graph database node. Therefore, any collection of data nodes and edges in one GraphDBN may be transferred to and merged with another GraphDBN. The receiving GraphDBN configured according to the principles of the invention may readily merge the transferred subset or complete graph. Several exemplary applications for these aspects of the invention may include, but are not limited to:

Fast and easy creation of multiple GraphDBNs to support a multi-participant project or other collaboration. This may be useful to intelligence community when multiple agencies need to collaborate and share information regarding a specific threat, for example.

Merge one company's GraphDBN including all of their electronic assets, such as user accounts, file repository, and access controls, with another company's GraphDBN including all of their electronic assets, such as user accounts, file repository, and access controls. This may be a useful and expeditious unification when one company acquires another company, for example.

Split one company's GraphDBN into two or more fully functioning GraphDBNs. This may be useful, for example, when a company reorganizes into multiple independent operating units, or when one business unit of a company may be acquired by another company, or, when spinning off a business unit.

Create one or more private internets for Regional Health Information Exchanges to which multiple medical offices, hospitals, and other organizations can be invited to join. A system configured according to the principles of the disclosure may be used to create a collector Health Information Exchange GraphNet, with a separate GraphDBN created for each of multiple Regional Health Information Exchanges. Information may readily flow from the regional GraphDBNs and be merged into a collector GraphDBN.

The constructs used as building blocks of a system and method for creating, deploying, and integrating new nodes in a distributed network of graph databases may include, but are not limited to the following:

Graph Database (GraphDB)
Graph Data Node (GraphDN)
Graph Database Node (GraphDBN)
Forms Language constructs: Forms, Relations, Relationships
Network
Information Graph
Create, Deploy, and Integrate a GraphDBN
Messaging Server
Selecting and Packaging a Subset of or a Full Graph
Merging Graphs and Subsets of Graphs
Virtual Private Graph
Private Internet These constructs may be applied to build a system and method for creating and distributing nodes in a network of distributed graph databases using principles of the disclosure, described herein.

GraphDB, Graph Database Node, Data Node and Edge Constructs

A Graph Database (GraphDB) may be a collection of information modeled as objects (data nodes) and joined by relationships (edges). Graph databases may typically include constructs to create data nodes, as well as the edges that link the data nodes, and a varied set of application programming interfaces (APIs) to add information to the graph, query the graph, traverse the graph, maintain the graph, and the like. In one aspect, the GraphDB may itself be configured as a node in the graph, referred to as a graph database node (GraphDBN), and the graph database node may be decomposed by selecting one or more subsets of the data nodes, including edges, it contains and using those subsets to create new graph database nodes that may then evolve and expand through the addition of new nodes, new edges, and the like. These and any other GraphDBN may be distributed across a multiplicity of virtual and/or physical servers. In a distributed set of GraphDBNs, the relationships, or edges, between nodes may be maintained across servers as each data node and edge may have a unique identifier and may contain immutable data. The unique identifier may provide for maintaining the integrity of data nodes and edges in a distributed system. The immutable data of a data node and edge may further support the maintenance of information integrity. In a system where the integrity of data nodes and edges may be maintained through the use of unique identifiers and immutability, evolution of data nodes and edges may only be possible through the addition of any of: a new edge joining two existing data nodes and the addition of a new data node and a new edge joining that new data node.

A data node may also provide for binary large object (BLOBs) to be contained within a graph database node, and may enable the graph database node to contain unstructured content such as, but not limited to, files, and may provide for graph database nodes to include data nodes that are BLOBs in subsets shared through merge operations, where a primitive binary string entity may contains the file content.

Forms Language Constructs: Forms, Relations, Relationships, and Entities

The Forms Language may provide a structure that may be used to create and assemble diverse and richly linked webs of Entities in streams, databases, graph databases, and the like. The Forms Language may permit the creation of "Forms", which may define the class properties of the Entities each represents and may define the relational structure of each specific type of Entity. A form defines a data nodes and the class defined by a Form may be a Form Entity, Relation Entity, Relationship Entity, or any other Entity that may be instantiated by a Form. In one example implementation, a java class may be declared for a particular Form type as follows:

public class Folder extends Content { . . .

In this example, the Folder Form class extends and inherits from the Content Form class. Continuing this example, the Content Form class declaration may be as follows:

public class Content extends Entity { . . .

Indicating that the Content Form class extends and inherits from the Entity Form class. Because the Folder Form class extends and inherits from the Content Form class, the Folder Form class also inherits from the Entity Form class. When inheriting from a class, the class hierarchy may typically mimic the Form hierarchy.

Each Entity instantiated from the Form may be an instance of the class the Form defines. The structure of a Form may be defined by a set of Relations that bind, or link, one Form together with other Forms. Each of the set of Relations may are be defined by Forms and may also be classes. These Relations may associate meaning, context, and content with Forms they link. The Relation may link the Form that contains it with the Form that is its target.

FIG. 3 is an illustration of a Form and its Relations, generally designated by reference numeral 300. In the Form and Relation example 300, Form 1 (310) includes Relation 1, Relation 2, and Relation N, where N signifies any number greater than 2. Relation 1 links Form 1 (310) to Form A (350) through right side Relation of Relation 1 and Corresponding Relation 1 on Relation Form 1 (320), respectively. Relation 2 links Form 1 (310) to Form B (360) through the right side Relation of Relation 2 and Corresponding Relation 2 on Relation Form 2 (330), respectively. Relation N links Form 1 (310) to Form C (370) through Relation N and Corresponding Relation N on Relation Form N (340), respectively. A Corresponding Relation may typically be used to join a Relation on a Relation Form to a specific Relation on the Form joined to by the right side Relation of the Relation Form.

Relations

In one implementation of the Forms Language, a Relation may be a function that maps a Form on one side (e.g., "logically" the left side or the input side) to a Form on the other side (e.g., "logically" the right side or the output side). The Relation itself may be a Form of type Function. FIG. 4 is an exemplary illustration of a Relation, generally designated by reference numeral 400. In this example, Relation Form 400 may include:

a Relation 1 Form (430) for Relation 1 (420), that links a Left/Input Form (410) through the Left Side/Input Relation (440) to a Right/Output Form (460), through the Right Side/Output Relation (450), and a Corresponding Relation (470) that links to Relation 2 (480) on the Right/Output Form.

Once a Form and its Relations are defined, the Form may be instantiated to create new Entities that are joined to other Entities through Relations and Relationship Entities. Each Entity instantiated from the Form is an instance of the class the Form defines. The example functions represented by the example Relations shown in FIG. 4 (400) are listed in Table 1.

TABLE 1

| Example: Form 1 (410) Relation Functions | | |
| --- | --- | --- |
| Relation | Input/Left Side Form | Output/Right Side Form |
| Relation 1 | Form 1 (410) | Form A (450) |
| Relation 2 | Form 1 (410) | Form B (460) |
| Relation N | Form 1 (410) | Form N (470) |

In the more specific example of a Relation Form, generally denoted by reference numeral 500, shown in FIG. 5, The Name Relation Form 500 may include a Person Form (510) with a Name Relation (520). The Name Relation (520) is defined by a Name Relation Form (530) that links the Person Form (510) through Left Side Relation 1 (540) to the Name Property Relationship Form (560) through Right Side Relation 1 (550). The Name Relation Form (530) may include a Corresponding Relation 1 (555) that links to the Parent Relation (568) on the Name Property Relationship Form (560). The Name Property Relationship Form (560) includes a Child Relation (565) which is defined by the Child Relation Form (570). The Child Relation Form (570) links the Name Property Relationship Form (560) through Left Side Relation 2 (575) to the String Primitive Form (585) through Right Side Relation 2 (580). The String Primitive Form (590) may include a Corresponding Relation 2 (585) that links to the String Value Relation (595) on the String Primitive Form (590). The String Primitive Form (590) may be instantiated to an Entity that may contain the string with the name when the Person Form is instantiated.

Throughout this disclosure, for ease of discussion and simplicity, the text and illustrations do not typically include a display and description of the Relation Form that corresponds to each Relation. Relations are typically shown as linking directly to the right side/output Form.

The phrase "left Form" and the phrase "right Form" used in this disclosure (including the claims) are names given to the respective logical objects associated with a relation Form and are not meant to refer to an actual specific physical limitation or a specific physical arrangement; the terms are simply names for the respective logical objects to permit improved explanation/description of the relation Form. Similarly, the phrase "left side relation" and the phrase "right side relation" (or "right side relations") used in this disclosure (including the claims) are names given to the respective logical references (i.e., pointers or linkages) associated with a relation Form and are not meant to refer to an actual specific physical limitation or a specific physical arrangement; the terms are simply names for the respective logical references to permit improved explanation/description of the references associated with a relation Form.

When a Form is said to "have" a set of Relations, it means that the Form is targeted by those Relations on one side (e.g., the left side, the input side). When a Form is "produced" by a Relation, it receives the Relation (e.g., the right side, the output side).

Using Forms Language, any number of Entities, including Forms, Relations, Relationships, Entities instantiated from Forms, and the like may be created. A Relation is an entity that may link one Form to another Form. A Relation may map a Form on one side, (e.g., the input side, the left side) to a Form on another side (e.g., the output side, the right side).

A Relation on a Form may point to another Form, a Relationship Form, or another entity. A Relationship Form may itself contain Relations that may point to another Relationship Form or another Form. The type of Form that a Relation points to may depend on whether the Relation is variant or invariant. A Relation may be designated as variant if there may be a need to change the target output at some time. A Relation may be designated as invariant if there will never be a need to change the target output.

Relationships

A Relationship may be Entity that defines and edge and may therefore be defined by a Form and its Relations. A Variant Relation typically links to a Relationship through the ride side Relation on the Variant Relation Form. Relationship Entity may be the link between the right side Relation of a Variant Relation on an Entity and another Entity Form, or when instantiated, may link a ride side Relation on the Variant Relation on one Entity to a Relationship Entity. Relationships created using the Forms Language may be mostly invariant. Relationships are immutable because a relationship is an association. If any part of the association changed, it would no longer be the same association. Therefore, because Relationship entities are associations, a relationship entity may be invariant (or characterized by invariant relations). In a system configured according to the principles of the disclosure, changes may be signified only through the addition of new Relationship Entities that may create new linkage between entities.

Because Relationships may be defined by a Form, an edge may also an entity. Additionally, because Relationships may be defined by a Form and a Form may be a class, a Relationship may also be a class. As a class, a Relationship may be considered a first-class object so that change itself may be an object in the system rather than simply the result of an action. According to the principles of the disclosure, a Relationship represents change in a system. Relations belonging to a Form are mostly immutable, and rather than changing are classes that represent the changes in the system. As such, Relationships may reflect differential data with respect to one or more entities in a system. In one aspect, information may be expanded in such a system only through the accrual of differential data using Relationships and/or non-relationship entities.

The changes that may be signified by a Relationship may be considered to be changes on one entity with respect to one or more other entities. FIG. 6 is an exemplary diagram of a Relationship Entity Signifying Change to a Variant Relation, generally denoted by 600. For example, as shown in FIG. 6 (600) the removal of Folder Entity 4 (655) as a Child of Folder Entity 1 (625) is a change in the containment of Folder Entity 1 (625) with respect to Folder Entity 4 (655). Similarly, FIG. 7 is an simplified example of a substitution relationship, generally denoted by 700. As shown in FIG. 7 (700), the change of a Person Entity's Name (720) from "Joe" to "Joseph" is a change of the Name Relationship Entity (740) with respect to Person Entity 1 (720).

Relationships may be versioned, or substituted, through a process in which the Relationship linking one Entity to another Entity may be updated by inserting a Substitution Relationship. This Substitution Relationship may point to the Relationship being updated as the Previous Version Relation and the new Relationship as the Version Next Relation. During the substitution process, the existing Relationship linking the two entities may be assigned to the "Previous Version Relationship" in the Substitution Relationship Entity. In addition, the newly created Relationship linking the two entities may be assigned to the "Next Version Relationship" in the Substitution Relationship. FIG. 7 is an illustration of a simplified example of a Substitution Relationship, configured according to the principles of the disclosure, generally denoted by reference numeral 700. In this example, a Person Entity (710) includes a Name Relation (720) that is linked to the String Entity assigned a value of "Joe" (730) through the Name Relationship Entity 1 (740). The Name Relationship (720) may be updated to point to the String Entity assigned a value of "Joseph" (790) to "Joseph" by creating a Substitution Relationship Entity (750) that assigns the existing Name Relationship 1 (740) that points to the String Entity assigned a value of "Joe" (730) as the Previous Version Relation (760), and assigns the assigns the new Name Relationship 2 (780) that points to the String Entity assigned a value of "Joseph" (790) as the Next Version Relation (770).

To negate a Relationship during the substitution process, as shown in FIG. 6 (600). the Next Relationship (660) may be pointed to a null entity (680).

GraphDBN

In one aspect, a Graph Database Node (GraphDBN) may be an instance of a GraphDB that may be integrated with zero or a multiplicity of GraphDBNs. This collection of one or more GraphDBNs may be considered a Graph Database Network (GraphNet). Each GraphDBN may have zero or a multiplicity of parent GraphDBNs and may have zero of a multiplicity of child GraphDBNs. A GraphDBN may parent itself in certain configurations.

Characteristics that may be associated with a GraphDBN configured according to principles of the disclosure may include, but are not limited, any one or more of the following:

Name: Name of the network associated with the Graph-DBN

Routing Name: A unique identifier and address for the GraphDBN, may be human readable or machine readable;

IP address: internet locator for the GraphDBN;

Parent(s): the GraphDBN(s) that may parent a specific GraphDBN

Child(ren): the GraphDBN(s) that may be child(ren) of a specific GraphDBN

Inbox: A container for information packages that may be sent to the GraphDBN;

Outbox: A container for information packages that may be sent from the GraphDBN;

Date and time that the GraphDBN may have been created;

PeerList: Other GraphDBNs with which a GraphDBN may directly communicate;

MessagingServerAddress: location of the messaging server, if any exist; and

Verification key: code that may be used to validate that the new GraphDBN is a child of a specific parent Graph-DBN.

Linking GraphDBNs

GraphDBNs may be linked in a computing system configured according to principles of the disclosure through a process that triggers creation of the new GraphDBN. This process may be initiated while operating under the context of an existing GraphDBN. The process may be triggered using a programming script that includes certain parameters, or through a web or other client software interface in which a user specifies some or all of the parameters. The newly created GraphDBN may typically be a child of the GraphDBN on which the creation process was initiated, or the child of some other specified parent GraphDBN. In some implementations, the newly created GraphDBN may be its own parent, and the initial node in a GraphNet.

Network

The Network may be a human-readable term used to label a GraphDBN and may typically be specified through a user interface or in a script that initiated creation of the GraphDBN. The Network label may be the name of the organization or collaboration associated with a GraphDBN. For example, if John Smith, an employee of Acme, Inc. initiated creation of a new GraphDBN using an interface on an existing GraphDBN, he may name the node the "Acme Inc. Network".

Selecting and Packaging a Subset or Complete Graph

Each GraphDBN may include processes and methods to select a subset of the graph database node or the full graph database node to share with another GraphDBN. This process may also be used in a system configured according to the principles of the disclosure to send configuration, verification, and other information to the new GraphDBN from the parent GraphDBN(s), as well as to send information from the child GraphDBN(s) to the parent GraphDBN(s).

Messaging Client/Server

Each GraphDBN may have access to a messaging server that may be used to send a subset of itself to another GraphDBN in the GraphNet. The messaging server may be contained in a virtual machine that also contains the GraphDBN, may be installed on the same physical server on which the GraphDBN is deployed, or may be installed in a separate virtual or physical server that the GraphDBN can access. One of ordinary skill in the art may recognize that a variety of other configurations for the GraphDBN and messaging server may be possible.

Each GraphDBN may also access to a messaging client that may receive messages from the messaging server. The messaging client may be contained in a virtual machine that also contains the GraphDBN, may be installed on the same physical server on which the GraphDBN is deployed, or may be installed in a separate virtual or physical server that the GraphDBN may access. One of ordinary skill in the art may recognize that a variety of other configurations for the GraphDBN and messaging client may be possible.

Graph Merge Process

In one aspect, the invention may include processes accessible to each GraphDBN that may be used to merge a subset of a graph database node or an entire GraphDBN that may be sent from one to one or more GraphDBNs. When sharing a subset of a GraphDBN or the full GraphDBN, the processes managing the sharing may package the GraphDBN contents (data nodes) and its shape (edges), and may send the information as a graph of a structure that may be interpreted as a graph by another GraphDBN. Because the receiving GraphDBN also comprises data nodes and edges, both with immutable data, the merge process may add the new data nodes and edges directly through a union operation.

Most of today's database to database information sharing or information exchange is typically based on XML. The operators of the source and recipient databases typically negotiate an acceptable schema, prepare the processes to extract and/or convert the information to be shared to XML, and user web services to transfer the XML payload. The recipient database then parses the XML, transforms it as needed, and loads it into the recipient database. However, in contrast, in a system configured according to the principles of the disclosure, predefining the shape of the data to be shared may typically not be required. Both the source graph database and recipient graph database may comprise data nodes and edges, both of which contain immutable data, the shared graph data nodes may be directly merged with the recipient graph database node through a union operation, and the linkages may be maintained.

A graph database node configured according the principles of the disclosure may include a collection of data nodes that may be linked to one another through edges that are also data nodes. The edge may also be referred to as a relationship. This linkage of data nodes using edges may create a graph structure. Each data node in the graph database node configured according the principles of the disclosure may also have an identifier that is typically unique. Additionally, a data node may also be immutable in that the evolution of the data node may typically be completed through the addition of new edges joining the data node to existing data nodes, or new data nodes and new edges joining the new data nodes to the evolving data node. The identifier and immutability aspects of a data node maintain the integrity of the data node as it is distributed among a set of graph database nodes.

With these linkage, identifier, and immutability aspects, any subset of data nodes in a graph database node may be shared and merged through a union operation with any other graph database node that is also configured according to the principles of the disclosure. The subset may be transferred as a packet, in binary format, as a stream, or in another data format using a messaging process, service oriented process, information exchange process, and the like. As graph database nodes configured according to the principles of the disclosure may include data nodes and edges, and any subset of a graph database node being shared may also include data nodes and edges, the subset may be readily merged with the receiving graph database node by adding the data nodes in the subset being shared to the set of data nodes in the receiving graph database. In some sharing operations, at least one new edge may be created that may specifically join one or more data nodes in the subset with one or more data nodes in the receiving graph database.

The steps shown in FIG. 8 starting at 800 describe one exemplary implementation of a process that may be used for sharing a subset of a source graph database node or entire source graph database node with a recipient graph database node:

Step 805: Select a subset of data nodes to be shared from a source graph database node.

Step 810: Select at least one recipient graph database node.
The recipient graph database node may be selected:
Directly using for example, its routing name, a name, or some other identifier or
Indirectly by selecting, for example, a specific recipient data node on the recipient graph database node.

The recipient graph database node may be the same as the source graph database node.

Step 815: Serialize the selected subset for transfer. The serialization format may take on any variety of serialization formats, including but not limited to: binary, binary XML, stream, XML, and the like.

Step 820: Transfer to the recipient graph database node the selected subset via a communications protocol. The transfer process may include authentication processes, may be completed through an intermediary graph database node that is neither the sender nor recipient, may use peering mechanisms, and the like. Thus, the graph database nodes may be communicative with one another via the electronic communication protocol.

Step 825: Deserialize the selected subset.

Step 830: Merge each data node in the selected subset, typically using a union operation. Because each data node in the shared subset, the sending graph database node, and the recipient graph database node may all contain immutable data, the shared subset may be merged using a union operation. This operation may compare data node from the shared subset with the data nodes in the recipient graph database node. If the data node from the shared subset already exists in the recipient graph database node, the data node may be skipped and may not be inserted into the recipient graph database node. If the data node from the shared subset does not already exist in the recipient graph database node, the data node may be inserted into the recipient graph database node. This process may expand the information content of the recipient graph database node, and may maintain the integrity of all data nodes in the shared subset, the sending graph database node, and the recipient graph database node.

This process may be repeated multiple times to share the selected subset of a source graph database node or entire source graph database node with a multiplicity of graph database nodes.

One example of a computer-based network system configured according to the principles of the disclosure may comprise a plurality of graph database nodes so that any subset of information contained in any of the plurality of graph database nodes is shareable with any other graph database node in the network system using a merge operation. In this example, the plurality of graph database nodes may comprise at least two data nodes and at least one edge linking the at least two data nodes; the subset of information may also comprises at least one data node; and the at least one data node may contain immutable data so that the at least one data node may be evolvable through the addition of at least one new edge that is also a data node, and the at least one new edge may link at least one data node to at least one other data node so that the integrity of the at least one data node, the at least one other data node, and the at least one edge may be maintainable during sharing and merging of the subset of information throughout the plurality of graph database nodes so that the any of the plurality of graph database nodes data nodes and the any other graph database node may be least partially synchronized.

Additionally, the merge operation may be accomplished through a union operation that expands the information of the any other graph database node. The graph database nodes may then evolve separately and may be selectively synchronizable. The immutable data of a data node may include an identifier and a date/timestamp and may provide a basis for knowing the state of the computer-based network system at any point in time Note that the any graph database nodes may be partially of fully synchronizable with any other graph database node through sharing through a merge operation subsets of the data nodes so that distributed collaboration on the subset of information may occur through the addition of any of: a new edge joining at least one data node from the subset of information with at least one data node from the any other graph database node, the addition of a new data node from the subset of information and a new edge joining that new data node with a data node from the any other graph database node, and the addition of a new edge from the subset of information joining two data nodes already contained in the any other graph database node, thereby expanding the amount of information linked to the any other graph database node. The subset that is shared through a merge operation with any of the plurality of graph database nodes may also include the full information set.

These characteristics of systems configured according to the principles of the disclosure may be beneficial to large organizations with multiple divisions and many offices that use portions of information sets for many different business purposes. For example, suppose Company X has 5 divisions and 100 offices. Each of the divisions and offices uses a specific data set for a slightly different purpose, and the initial data set evolves on divergent paths. In some circumstances there may be a desire to share a portion of the divergent data set. In systems of today before this disclosure, the data set may be replicated across the separate data systems used by the many offices or divisions. Changes may be shared but require a tedious process of agreeing on data structure and format, writing web services to share the information, parsing XML, and related activities. Sharing different data, changing the shared data, or sharing with a new group repeats the tedious process.

However, in contrast, in a system configured according to the principles of the present disclosure, a company may be running a system that may include a network of distributed graph database nodes configured according to the principles of the disclosure. The initial data set, organized as a graph database, may be merged into one of the graph database nodes to the company graph network. Subsets of the graph database node that include the initial data set may be shared and may be distributed to create graph database nodes for each division, each office, or some combination of divisions and offices. New information may be added to each graph database node through the creation of new edges, new nodes, or both. An expanded information set linked to a data node from the initial data set may be selected as a subset of the graph database node that contains it, and may be shared with any other graph database node in the network. The receiving graph database nodes may readily merge the shared subset, and the information is made available essentially immediately, i.e., essentially real time, which may be dependent on system processing capacity and/or throughput.

Continuing the example, these aspects may become even more important in a scenario in which an error in a data node that was part of the initial data set may have been identified. In systems of today before the invention, attempting to quickly identify and rectify all systems that may use the erroneous data node may be a lengthy and onerous process. In a system configured according to the principles of the present disclosure, the error may be rectified through the addition of new edges, new nodes, or both that may result in an evolution of the data node to be linked to the correct information. The data node linked to the corrected information via an edge and a data node may be selected as a subset of the graph and shared with all other graph database nodes in the network, and immediately merged.

Creating, Deploying, and Integrating a New GraphDBN in a Parent:Child Configuration Systems configured according to the principles of the present disclosure may include a set of automated steps and processes that may be used to create, deploy, and integrate a GraphDBN into a GraphNet. An illustrative flow diagram outlining one implementation of the steps is shown in FIG. 3, generally denoted as 300. One of ordinary skill in the art may recognize that the order of steps may change, additional steps could be incorporated for a variety of purposes, and some steps may be unnecessary in certain implementations. For example, additional steps may be needed to incorporate VPN technology to secure communications between GraphDBNs in the GraphNet and between clients and the GraphDBNs; additional steps to add SSL to secure communications; and alternate or additional steps to deploy on physical rather than virtual servers, are a few examples.

The steps shown in FIG. 9 starting at 900 describe one exemplary implementation of a process that may be used in creating, deploying, and integrating a new GraphDBN into a GraphNet:

Step 905: A user may interact with at least any one of a web interface, API, command-line interface, and the like to specify parameters for a new GraphDBN and verify the request.

Step 910: The system may registers a new GraphDBN with the parent-GraphDBN.

Step 915: The system may create membership for the new GraphDBN in the parent GraphDBN.

Step 920: The system may request allocation of a new virtual machine.

Step 925: The system may copy the GraphDBN image to the allocated virtual machine. In other configurations, the system may directly install a GraphDBN to a physical server or virtual machine.

Step 930: The system may complete preliminary configuration and GraphDBN may be automatically deployed.

Step 935: The new GraphDBN may read its settings file and sets properties as appropriate. The settings file may include information such as a name for the GraphDBN, routing name, location of the parent GraphDBN, SSL key, and the like.

Step 940: The new GraphDBN may contact the parent GraphDBN, may send a verification key, and may request additional settings files.

Step 945: The Parent GraphDBN may authenticate the child GraphDBN verification key and may send initialization data.

Step 950: The new GraphDBN may accept and may incorporate the initialization data.

Step 955: The new child GraphDBN may be active, may be integrated into the GraphNet, and may be fully operational.

One of ordinary skill in the art may recognize that any combination of automated and manual steps may be used to create, deploy, and integrate GraphDBNs in a parent:child configuration, and that some scenarios may require additional of fewer steps that shown in FIG. 9.

Creating, Deploying, and Integrating GraphDBNs in a Loosely Coupleable Configuration A graph database node may also be deployed in a loosely coupleable configuration in which the newly created GraphDBN is not a child of another GraphDBN. In this configuration, new GraphDBN may be created and deployed, and may share subsets of data nodes and edges directly with other GraphDBNs through a peering or other similar connection, or may share subsets of data nodes and edges through an intermediary. In this configuration, the GraphDBNs are loosely coupled rather than explicitly linked in a parent:child configuration. The steps shown in the flow diagram of FIG. 10 starting at 1000 describe one exemplary implementation of a process that may be used in creating, deploying, and loosely coupling a GraphDBN with other GraphDBNs:

Step 1005: A user may interact with at least any one of a web interface, API, command-line interface, and the like to specify parameters for a new GraphDBN and verify the request, this may be considered an example of an initial request Step 1010: The system may request allocation of a new virtual machine.

Step 1015: The system may copy the GraphDBN image to the allocated virtual machine. In other configurations, the system may directly install a GraphDBN to a physical server or virtual machine.

Step 1020: The system may complete preliminary configuration and GraphDBN may be automatically deployed.

Step 1025: The new GraphDBN may read its settings file and sets properties as appropriate. The settings file may include information but is not limited to information such as a name for the GraphDBN, routing name, peering list of other GraphDBNs with which the new GraphDBN may directly share subsets of data nodes and edges, SSL key or other authentication information, and the like.

Step 1030: The new child GraphDBN may be active, may be loosely coupled with other GraphDBNs, and may be fully operational.

One of ordinary skill in the art may recognize that any combination of automated and manual steps may be used to create, deploy, and integrate GraphDBNs in a loosely coupled configuration, parent:child configuration, and that some scenarios may require additional of fewer steps that shown in FIG. 10 (1000). Note that information required to integrate with other GraphDBNs and share subsets of data nodes and edges may be provided at any time before, during, or after creation of the GraphDBN. This information may be provided as a subset of data nodes and edges, manually added, added through an interface, or through similar techniques. A graph database node configured according to the principles of the disclosure may share subsets of data nodes and edges with any other graph database node configured according to the principles of the disclosure.

Additional Examples of Creating and Deploying GraphDBNs and Sharing and Merging Subsets in Parent: Child or Loosely Coupleable Configurations FIG. 11 is an illustrative flow diagram of a computer-implemented method for creating, deploying, and integrating graph database nodes containing data nodes that may be defined by Forms in a distributed graph database network that performs the following steps, entering at 1100:

Step 1105: creating a first graph database node that may have a first set data of nodes, each typically having an identifier and a first set of edges linking the first set of data nodes. The first graph database node may also have a first routing name;

Step 1110: creating a second graph database node that may have a second set of data nodes, each typically having an identifier and a second set of edges linking the second set of data nodes. The second graph database node may also have and a second routing name;

Step 1115: sharing a first subset of the first graph database node with the second graph database node, wherein the shared first subset may be merged into the second graph database, and may at least partially synchronize the first graph database node and the second graph database node so that substantially similar information may be available to users of the first graph database node and the second graph database node and distributed collaboration on the first subset may occur as new data nodes are created and linked to the first subset through addition of new edges. This process may provide for the independently expansion and evolution of a set of information linked to the shared first shared subset so that the set of data nodes added to the first graph database and linked to the first shared subset may be selectively shared with the second graph database, and the set of data nodes added to the second graph database and linked to the first shared subset may be selectively shared with the first graph database.

In the flow of FIG. 11, in another aspect, a second subset of the second graph database node may be shared with the first database node, and the second subset may include any portion of the shared first subset, any new data nodes joined to the portion of the shared first subset with new edges, and the new edges so that the expanded and independently evolving information set may also be available to users of the first graph database node. This sharing may at least partially synchronize the first graph database node and the second graph database node so that a substantially similar information set may be available to users of both the first and second graph database node. Note that a shared subset may comprise the entire first graph database node or the entire second graph database nodes.

The shared first subset may be merged into the second graph database node though the creation of at least one new edge in the second graph database node so that the shared information is directly linked to at least one data node or edge in the second graph database, thus expanding the information set of the second graph database node. After merging, the shared first subset may be made substantially instantaneously available to the second graph database node and expanded through the addition of new edges linking to new nodes for collaboration while at the same time preserving the integrity of the shared first subset.

As the second graph database node evolves and new edges are created between data nodes in the merged shared first subset, a subset of the second graph database nodes that includes at least one data node from the shared first subset may be shared back with the first graph database node or any other graph database node with which the second graph database node may share subsets, thus sharing the expanded information set and at least partially re-synchronizing with the first graph database node or partially synchronizing with a different graph database node, propagating the results of distributed collaboration throughout a distributed grid of graph database nodes.

Moreover, the subset of the first graph database node may be shared with a third graph database node so that the first graph database node may be at least partially (or fully) synchronizable with the third graph database node and may expands in substantially real-time the information set of the third graph database node. Additionally, a configuration may include a substantially unlimited number of graph database nodes that may share subsets of nodes and edges. For example, in a 100 graph database node configuration, subsets may be shared between the 25$^{th}$ graph database node and the 85$^{th}$ graph database node. The expanded shared subset in the 85$^{th}$ graph database node may then be shared with the 18$^{th}$ graph database node. Any graph database node may share subsets with any other graph database node, and the any other graph database node may merge the shared subset with its data nodes and edges. The sharing graph database node may communicate with the receiving graph database node using an electronic communications protocol and a routing name or other locational identifier of the receiving graph database node, and to share the first subset of the sending graph database node with the receiving graph database node. Additional authentication may be appropriate for sharing, and may include peering mechanisms, SSL keys, other handshake mechanisms, and the like. The receiving graph database node may also be a sharing graph database node for purposes of sharing subsets of its data nodes and edges. Similarly, the sharing graph database node may also be a receiving graph database node for purposes of receiving subsets of other graph database nodes.

Example Configurations of GraphDBNs

The processes shown in FIG. 9, FIG. 10, and FIG. 11 may be repeated multiple times to create a variety of configurations. One of ordinary skill in the art may recognize that many network configurations may be possible when configured according to the principles of the disclosure, additional steps may be incorporated for a variety of purposes, and some steps may be unnecessary in certain implementations. FIG. 12, starting at 1200, shows an exemplary network that may result from the illustrative scenario described below, and substantially similar to the architecture shown in FIG. 2.

CompanyZ Parent GraphDBN

Company Z operates a GraphDBN (1205) that serves as a central hub in a distributed graph database network. Company Z has server clients (1240, 1240b, 1240c) that directly access its graph database node Child GraphDBNs—Acme Acme Incorporated wants to participate in the distributed network of graph databases. Acme Inc.'s corporate headquarters is in Boston, Mass. Company Z creates an Acme Incorporated GraphDBN (1210) for the corporate headquarters in a hosted Cloud environment. This node may be referred to as the Acme-Corporate GraphDBN (1210).

Each staff member in Acme Corporate triggers deployment of a node to their laptop or desktop from the Acme-Corporate GraphDBN (1225a, 1225b, 1225c).

Acme Incorporated has two additional offices, one in Atlanta, Ga. and one in Philadelphia, Pa.

The Atlanta, Ga. office has seven staff and runs their own server 1215.

The Philadelphia, Pa. office has seven staff and runs their own server 1220.

Acme Inc. triggers deployment of a GraphDBN for the Atlanta, Ga. office directly on the GA office server from the Acme Corporate Node. This new GraphDBN may be referred to as the Acme-Atlanta GraphDBN (1215).

Acme Inc. triggers deployment of a GraphDBN for the Philadelphia, Pa. office directly on the PA office server from the Acme Corporate GraphDBN. This new node may be referred to as the Acme-Philadelphia GraphDBN (1220).

Each staff member in Atlanta, Ga. offices triggers deployment of a node to their laptop or desktop from the Acme-Atlanta GraphDBN (1230a, 1230b, 1230c, 1230d, 1230e, 1230f).

Each staff member in Philadelphia, Pa. office triggers deployment of a node on their laptop or desktop from the Acme-Philadelphia GraphDBN (1235a, 1235b, 1235c, 1235d, 1235e, 1235f).

An exemplary architecture expanding the configuration shown in FIG. 6 is shown in FIG. 13, generally denoted as 1300:

The following additional companies are also participating on the Company Z Hub GraphDBN (1305), and each has their own GraphDBN and clients:
Smith Legal Incorporated Graph DBN (1325) and clients (1375)
Jones Accountants and Company Graph DBN (1340) and clients (1380),
Reston Analytics LLC GraphDBN (1335), and clients (1375)
Southern Surveyors Incorporated GraphDBN (1330) and clients (1370).
Acme Incorporated is acquiring The Baker Group, LLC.
Acme creates a new GraphDBN (1310) for the acquisition.
Acme invites the graph database nodes for Smith Legal Incorporated (1325), Jones
Accountants and Company (1340), Reston Analytics LLC (1335), and Southern Surveyors Incorporated (1330) to participate in this cross-organizational GraphDBN.

In this example GraphNet, some GraphDBNs may communicate directly with other GraphDBNs, such as Acme Corporate (1380) and Acme Philadelphia (1320), while other nodes communicate through an intermediary node, such as Acme Corporate and Jones Accountants (1340). This exemplary architecture illustrates the many combinations of parent child and loosely coupled GraphNet configurations that may be possible. After a communications pathway are resolved, subsets of the graph database nodes may be shared with other graph database nodes.

Additional Detail on Distributed Graph Database and Node Management

One example implementation of the packages, interfaces and classes developed to implement the system and method for creating, deploying, integrating, and distributing nodes in a grid of graph databases is described in this section. In this example implementation, a distributed system interacting with an object-relational data store is used. This implementation is exemplary and many alternate implementations are possible as one of ordinary skill in the art may recognize.
Overview
This exemplary implementation is built using the following baseline system architecture, building blocks, and interfaces:
Architecture
A distributed system interacting with an object-relational data store, similar to that shown in FIG. 2.
Building Blocks
GraphDB and constructs to create nodes and edges
Coral Virtual Machine
Messaging Server
GraphDBN Create, Deploy, and Integrate packages
Process to select and package a subset of the graph
Merge process, typically through a union operation
One of ordinary skill in the art may recognize a variety of architectures may be appropriate and that additional, fewer, or alternate building blocks may be warranted.
GraphDB and Node/Edge Constructs
A GraphDB configured according to the principles of the disclosure was used in this implementation. The GraphDB uses Forms to model objects as data nodes, relationships to model edges, and entities to instantiate Forms and Relationships. The relationships are also data nodes. This exemplary GraphDB was implemented using the java programming language.
GraphDBN Virtual Machine
The GraphDBN Virtual Machine configured according to the principles of the disclosure includes the GraphDB configured according to the principles of the disclosure, a web interface to interact with the GraphDB, virtualization technology, and a set of java methods and classes processes for creating, deploying, and integrating the GraphDBNs into the GraphNet.
Messaging Client and Server
The example implementation uses the JMS-compliant messaging client and server HornetQ. Additional detail on HornetQ can be found at http://www.jboss.org/hornetq.
Creating, Deploying, and Integrating a GraphDBN
In the example implementation, creating, deploying, and integrating a new GraphDBN configured according to the principles of the disclosure is managed through a java application that triggers, tracks, and manage the creation of new GraphDBNs configured according to the principles of the present disclosure, and new GraphNets configured according to the principles of the present disclosure. After a user enters the information required to trigger creation of a network through the web interface, the information entered by the user is written to the database and a verification request sent to the user's email address, or other designated address. The user may verify the network creation request, and certain parameters may be sent to a Network Control Center (NCC). The NCC uses this information to generate and track network creation tickets, communicate with the hosting provider to trigger deployment of a new virtual machine configured as shown in FIG. 2, populate initial configuration parameters, and contact the triggering GraphDBN configured according to the principles of the disclosure to request additional configuration information. The configuration information is what fully integrates the GraphDBN into the GraphNet configured according to the principles of the disclosure. This configuration information includes the internet protocol (IP) address of the new GraphDBN and the triggering GraphDBN, the GraphDBN name, the IP address of the messaging server and client for both the new GraphDBN and the triggering GraphDBN, and the initial user for the new GraphDBN.
Selecting and Packaging a Subset or Complete Graph
The system configured according to the principles of the disclosure may include a default view of each data node, its edges, its related data nodes, and their edges, to a certain expansion level. As a user or process selects a subset of a graph to share, the default view is executed and collects the selected part of the graph. The subset of the graph is then sent to the messaging server to forward to the specified destination.
Graph Data Node Merge Process
Graph data nodes may be merged at the receiving GraphDBN through a process that inserts the forwarded data nodes and edges. Each data node in the shared subset may be merged, typically using a union operation because each data node in the shared subset, the sending graph database node, and the recipient graph database node may all contain immutable data. This merge through union operation may compare data node from the shared subset with the data nodes in the recipient graph database node. If the data node from the shared subset already exists in the recipient graph database node, the data node may be skipped and may not be inserted into the recipient graph database node. If the data node from the shared subset is not contained in the recipient graph database node, the data node may be inserted into the recipient graph database node. This process may expand the information content of the recipient graph database node, and may maintain the integrity of all data nodes in the shared subset, the sending graph database node, and the recipient graph database node.

Illustrative Examples of Using Certain Principles of the Disclosure

Several examples of systems configured according to the principles of the disclosure are described in this section. One of ordinary skill in the art may recognize that these implementations are exemplary and many alternate implementations are possible.

In one aspect, a subset of a graph, an entire graph, or entire GraphNet may be shared. Each GraphDBN may include a graph database that may include nodes and edges. When sharing, the graph of the information to be shared may typically be what is shared, rather than a set of data formatted in a way defined by the provider, recipient, both, or some other party. Because the recipient GraphDBN or GraphNet may itself be a graph, and may include nodes and edges, the shared graph may be added to the recipient graph by simply adding the nodes and edges that are being shared. Using this approach, there may be no need to predefine schemas using XML or another information sharing specification, there may be no need to write web services to manage the transfer of the information, and there may be no need for complex extract, transform, and load (ETL) processes that may select, package and/or merge the information.

In another aspect, the GraphNet and GraphDBNs may be used to create a multiplicity of private internets that may participate in a distributed yet linked system.

In another example application that may benefit from a system configured according to the principles of the disclosure, suppose two companies, each with their own GraphDBNs, want to share information. Company 1 may select a subset of the information graph stored in its GraphDBN to share with Company 2. The shared graph may be immediately merged with the GraphDBN operated by Company 2. This merge process may be through a union operation and may typically include the creation of at least one new relationship joining at least one graph data node from the shared subset of Company 1's GraphDBN, and at least one graph data node from Company 2's GraphDBN. Alternatively, the new relationship may join at least one relationship in the shared subset of Company 1's GraphDBN, with at least one relationship from Company 2's graph DBN.

One benefit of this approach may be the difference between typical information sharing processes used by systems today. Today's' processes before the present disclosure may be commonly use a combination of XML, web services, data formatting software code and applications, data parsing software code and applications, conflict identification and resolution software code and applications for information sharing, all based on an agreed upon schemas. Today's processing using XML may typically require negotiating acceptable common data structures often through a lengthy discussion process with formal agreements. Complex routines may often be created to extract information from the source database and convert the data to the agreed-upon xml format, package the data, send it to the recipient database using web services. The recipient database may include processes to parse the XML, transform and load the data. This typically slow process may often require significant debugging and may typically be costly. Additionally, the conflict identification and resolution process may often include manual processes. A system configured according to the principles of the disclosure may eliminate or minimize several of these disadvantages as it may typically complete the process through a union operation. Because each data node in the shared subset, the sending graph database node, and the receiving graph database node may be unique and may contain immutable data, and evolution of each data node may be completed only through the addition of new data nodes and/or new relationships, the union process may not require conflict identification and resolution software code and applications, and any accompanying manual processes. Additionally, a slightly or significantly different structure for a set of data nodes may be integrated into the recipient graph database node through the creation of a new relationship linking the different structure to the data node to which it applies rather than requiring either the source or the recipient graph database node to alter their structure or use software to transform their structure to be consistent with a set of agreed upon standards.

In another aspect, a system configured according to the principles of the disclosure may be used by multiple companies, each with their own GraphDBNs, that may want to share research information. Research data may include large reports, large image and video files, a multitude of reference files. Suppose one researcher may want to share results with another researcher. If both researchers participate in GraphDBNs in a Coral GraphNet, the sharing researcher may select a set of information, specify that only the recipient researcher can access it, and may send the information and access controls to the recipient researcher. The information may be merged into the GraphDBN that the recipient researcher (or both researchers) uses for their work.

Additionally, systems of today typically do not create a hierarchy of GraphDBNs through parent/child characteristics. When configured according to the principles of the disclosure, one GraphDBN may be split into multiple GraphDBNs, which may be useful to companies with many offices or organization units, and companies that would like to quickly create a supplier network.

Systems of today before this disclosure do not provide for multi-parenting of GraphDBNs or multi-parenting of GraphNets. For example, two companies may participate in a joint venture, such as building and operating a wind farm. The two companies may both parent a GraphDBN for the windfarm project, making it easy for any member of the parent GraphDBN to access the windfarm project GraphDBN and readily access the information. Continuing the example, suppose the windfarm joint venture takes off and the partners decide to build several more windfarms. The windfarm venture company GraphDBN then parents five more GraphDBNs to support five additional windfarm construction projects.

Systems of today do not provide for creating a hierarchy of GraphNets through parent/child characteristics. For example, one GraphNet may be split into multiple GraphNets when a child GraphDBN parents multiple additional GraphDBNs. In this scenario, the GraphDBN become a child GraphNet. This may be useful to companies with many offices or organization units, and/or companies that would like to create a supplier network, for example.

Additionally, systems of today typically do not provide for creating a graph of GraphNets. This may be beneficial, for example, for a company that may want to deploy and operate a private implementation of an implementation using principles of this disclosure behind a firewall, creating a virtual private GraphNet (VPG). Continuing the example, the company may later decide to move their VPG out from behind the firewall and participate with another VPG. In a system configured according to the principles of the disclosure, their GraphNet of nodes and edges can be readily merged with the nodes and edges of the other GraphNet.

In another example, delivery of on-line training may be streamlined using a system configured according to the principles of this present disclosure. For example, suppose Widgets, Inc. and Training Unlimited, Inc. both operate GraphDBNs in a GraphNet configured according to the principles of the disclosure. Widgets, Inc. wants to buy training materials from Training Unlimited, Inc. Training Unlimited, Inc. wants to share study materials, tests, and answer keys with Widgets, Inc., but only with the users who are trainers and test administrators. Training Unlimited, Inc. can choose to share the set of materials with specific users at Widgets, Inc., and limit the recipient user's ability to share the materials with other users at Widget's Inc. When Training Unlimited, Inc. sends the information graph, the identity and access graph is also selected and sent. The information graph and access graph are merged into Widgets, Inc. GraphDBN, and access to the materials is controlled based on the specification in the access graph.

Additionally, a system configured according to the principles of the disclosure may provide certain advantages in creating a private internet and Threat-specific Graphs for Intelligence Agencies. For example, suppose a National Counter-Terrorism Center deploys a set of GraphDBNs configured according to the principles of the disclosure in a private internet configuration, including a GraphDBN for CIA, FBI, and NSA.FBI operates the FBI-GraphDBN in the Intelligence Private Internet. Suppose further that the CIA operates the CIA-GraphDBN in the Intelligence Private Internet. FBI at some point identifies a domestic threat being planned by a suspected international terrorist and calls it the "Operation Alpha Network" and creates a new GraphDBN and labels it the "Operation Alpha Network". FBI uses this GraphDBN to track the threat and invites CIA users to join the Threat-Specific "Operation Alpha Network" GraphDBN in the Intelligence Private Internet. FBI users send information it has on the threat to the "Operation Alpha Network" GraphDBN. CIA users review the information and send additional information they have on the threat to the "Operation Alpha Network" GraphDBN. Threat assessments are completed and shared between CIA and FBI on the "Operation Alpha Network" GraphDBN A system configured according to the principles of the disclosure may also be useful to support merger and acquisition activities. For example, suppose:
Western Movers, Inc. operates the Western-Movers GraphDBN on the North American GraphNet.
Nationwide Movers, Inc. operates the Nationwide-Movers GraphDBN on the North American GraphNet.
Nationwide Movers, Inc. acquires Western Movers, Inc.
Western Movers, Inc. may be associated with Nationwide Movers Inc. in one of several ways:
Western-Movers GraphDBN can be linked as a child of Nationwide-Movers GraphDBN;
OR
The entire Western-Movers GraphDBN can be merged with the Nationwide-Movers GraphDBN.
Similarly, a system configured according to the principles of the disclosure may also be useful in the event of a selling of a business unit. For example, suppose Ace Technology Company has a GraphDBN on the GraphNet and Duke Corporation has a GraphDBN on the GraphNet. Ace Technology decides to sell its computer manufacturing unit Duke Corporation. Ace Technology Company my share a subset of their GraphDBN that includes computer manufacturing unit to the Duke Corporation GraphDBN. The subset that includes the computer manufacturing unit graph may be readily merged with the Duke Corporation GraphDBN. In another implementation for this example, one or more graph database nodes and one or more graph database networks may be configured to be invitable to join another graph database node or another graph database network. This may also be useful for sharing a subset of their GraphDBN that includes computer manufacturing unit to the Duke Corporation GraphDBN, and the joining may create a new relationship between the one or more graph database networks and the another graph database network. In other types of business merger and acquisitions, the sharing through a merge operation aspect may be uses to create a new single graph database network comprised of multiple graph database nodes or graph database networks.

A system configured according to the principles of the disclosure may also be useful in for collaboration as part of a joint venture. For example, suppose Sand, Inc. operates a GraphDBN on the GraphNet and CQ, Inc. also operates a GraphDBN on a GraphNet. Sand, Inc. and CQ, Inc. want to enter into a joint venture to build and operate a wind farm. The joint venture is named WindNow, LLC. Sand, Inc. and CQ, Inc. may multi-parent a new GraphDBN, and name it the WindNow GraphDBN. Each parent may forward a subset of their graph, includes user graph, file graph, and other information as graph to populate the WindNow GraphDBN.

Additionally, a system configured according to the principles of the disclosure may also be useful in creating a Virtual Private Graph. For example, suppose a company with offices Austin, Tex.; South Africa; Syndey Australia; and Reston, Va. wants to operate a grid of graph databases, one for each office, behind their firewall. Using principles of the disclosure, the company may deploy a GraphDBN for each office, creating a Virtual Private GraphNet. The offices can easily send information as a graph from one office GraphDBN to another office GraphDBN.

In another example, a system configured according to the principles of the disclosure may also be useful in creating a private internet. For example, a retailer may want to communicate directly with all of its suppliers via the Internet. Using a process employing principles of the disclosure, the retailer operates a GraphDBN. The retailer creates a second GraphDBN as a child of their company GraphDBN. The retailer requires each supplier to operate their own GraphDBN. The retailer invites each supplier's GraphDBN to join the retailer's child GraphDBN. Thus creating a private internet where the retailer and all suppliers are organized in parent:child relationships.

Working Examples

The principles of Distributed Graph Database and Node Management described in this disclosure may be implemented in a variety of software applications and may be delivered with or without a graphical user interface, using tools such as Java, Python, C#, C++, Flash, HTML, and the like. Exemplary implementations of a software application delivered through a web interface using internet communications protocols are described in this section. This exemplary software application creates graph database nodes that include data nodes and edges, deploys the graph database nodes, integrates the graph database nodes in a network of distributed graph databases (GraphNet), shares and merges subsets of graph databases nodes between graph database nodes or GraphNets in a variety of possible formats, and organizes graph database nodes and GraphNets as private internets, private clouds, and the like, all configured according to the principles of the disclosure.

One of ordinary skill in the art may recognize that the Figures illustrating the interface features, organization of elements on an interface screen or page, inclusion of specific elements, use of a specific language, and naming of elements are exemplary; many variations of the provided examples are possible. These figures are designed to demonstrate how a system configured according to the principles of the invention may enable the functionality required for the interface to function. Any number of additions, substitutions, deletions, reordering, and renaming may be possible and the interface may still be enabled by the invention.

Additionally, one of ordinary skill in the art may recognize that a web-based graphical interface is not required for creating, deploying, and integrating graph database nodes in a distributed network of graph databases or sharing subsets of graph database nodes with other graph database nodes, all configured according to the principles of the disclosure. Each of these processes may be performed through an application programming interface (API), command line calls, or method and procedures calls made in a programming language.

FIG. 14 through FIG. 27 are exemplary illustrations of graphical user interfaces (GUI) configured according to the principles of the disclosure. The GUIs may represent functionality (i.e., software components executed by appropriate hardware) that requests user input, translates the input into a format consistent with a system configured according to the principles of the disclosure. One of ordinary skill in the art may recognize that many other implementations of an account creation interface are possible. The Figures showing graphical user interfaces (including FIGS. 14 through 27) may also represent block diagrams of software components embodied in a storage medium that when executed by an appropriate computing device produce the respective graphical user interface) and may display updates thereto and may receive inputs from a user. The Figures showing graphical user interfaces (including FIGS. 14 through 27) may also represent steps for constructing the various constructs described by the respective Figures and associate description, including but not limited to: graph database nodes, data nodes, relationships, GraphNets, and other constructs described herein.

A working system employing principles of the system and method creating, deploying, and integrating GraphDBNs in a distributed graph database network described herein has been developed and used in an application accessed through a web-based front end through the Internet. Line drawings of the working web interface are provided in this section. One of ordinary skill in the art may recognize that the system and method for creating, deploying, and integrating GraphDBNs in a distributed graph database network may be used to implement many other types of functionality, in either an internet or non-internet-based environment.

This example implementation of a system configured according to the principles of the disclosure includes the following:
  Login to an application that can create GraphDBNs
  Create a new GraphDBN
  Access the new GraphDBN
  Select a subset of the GraphDBN to send it to another GraphDBN Login to an Application that can create Graph Database Nodes A user may wish to log in to a system configured according to the principles of the disclosure. A user may access the login page (1400) perhaps similar to the one shown in FIG. 14 using an internet browser such as Microsoft Internet Explorer, Mozilla Firefox, Apple Safari and the like. In the body section (1415) of the page, the user may enter a username and password and click login to access the application. The system may attempt to authenticate the user and if successful, a My Graph Database Nodes page may be displayed. FIG. 15 is an illustrative graphical user interface showing an exemplary My Graph Database Nodes page for a web application built on a system configured according the principles of the disclosure, generally denoted by reference numeral 1500. The My Graph Database Nodes page 1500, that interacts with a system that accesses at least one graph database node, and any pages accessed after logging in to the web application, may include the following sections:

A header section (1505): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
  A menu/navigation bar (1510): a menu or navigation bar may include additional links that when clicked, may display to the user other pages of the application.
  A body section (1515): a body section of a web page typically includes the content, controls, elements, and other features that provide the primary functionality for a page.
  A footer section (1525): a footer section on a web typically includes other general content and link that are less important, such as the copyright information, link to a privacy statement, the name of the user logged in and accessing the page, and the like.
  The body section (1515) of a My Graph Database Nodes Page may include a listing of the names of the graph database nodes that a user may access and the status of each graph database node. The page may also provide links or buttons the user may click to access functionality to create a new graph database node, edit his/her global profile, and the like.

Create a New Graph Database Node

After logging in to the web application built on a platform configured according to the principles of the disclosure and clicking the Create a Graph Database Node link or button shown in the body section (1515) of FIG. 15, a Graph Database Node name and description page such as shown in FIG. 16 may be displayed. The Enter Graph Database Node Name and Description page (1600) and additional pages (1700, 1800, 1900, 2000, 2100) that may be accessed on the web site that are associated with creating a Graph Database Node may include the following sections:

A header section (1605): a header section typically consistent across all pages in a web site, may display a logo or other identifier, list the Company or Organization Name and a Tag Line, provide links to general pages such as about, contacts, help, for more information, the name of the Graph Database Node with which the page the user is viewing is associated, link or button to logout of the application, and the like.
  A menu/navigation bar (1610): a menu or navigation bar may include additional links that when clicked, may display to the user other pages of the application.
  A body section (1615): a body section of a web page typically includes the content, controls, elements, and other features that provide the primary functionality for a page.
  A footer section (1620): a footer section on a web typically includes other general content and link that are less important, such as the copyright information, link to a privacy statement, the name of the user logged in and accessing the page, and the like.

After clicking the "Create New Graph Database Node" link (1515), a page such as the one shown in FIG. 16 (i.e., page 1600) may be displayed. The body section of this page (1615) may include information that may be required to create a new Graph Database Node, which may include a new node in a distributed database graph configured according to the principles of the disclosure, including a Graph Database Node name, a Graph Database Node domain, and a Graph Database Node description.

After entering the Graph Database Node information and clicking the "Next" button in the body section (1615), a page similar to the Enter Graph Database Node Contact and Security Information page (1700) shown in FIG. 17 may be displayed. The body section (1715) of this page may include interface components the user may need to enter: information about the organization requesting the Graph Database Node, such as the name and web address; information about a contact person for the organization, including first name, last name, email, and phone number; information about an administrator for the organization, including first name, last name, email, and phone number.

After entering the organization, contact, and administrator information and clicking a "Next" button at the bottom of the body section (1715), a page similar to that shown in FIG. 18 (1800) may be displayed. This body section (1815) of this page may list terms and conditions for use of a web site for which a user is creating a Graph Database Node.

After agreeing to the terms and conditions of use and license restrictions and clicking "Next," a page similar to that shown in FIG. 19, page (1900) may be displayed. The body section (1915) may display the information the user entered in creating the Graph Database Node, including the Graph Database Node Name and Description, the Organization Information, the Contact Person Information, the Administrator Information, agreement with the Terms, Conditions, and License governing use.

After clicking "Confirm" in the body section (1915) of the page shown in FIG. 19 (1900), the My Graph Database Nodes page 1400 shown in FIG. 14 may again be displayed. As is typical with many web-based software applications, a confirmation email (or other mechanism) may be sent to the user that created the new Graph Database Node to confirm that they requested the creation of a Graph Database Node, and requesting that the user verify their request. FIG. 20 shows an example of email (2000) content that might be sent from the web site on which the user tried to create a Graph Database Node, and viewed with any traditional email client software. The message may contain a verification code that can be used to verify the Graph Database Node creation request and a link that the user may navigate to with an internet browser.

After accessing the web page at the link provided in the Graph Database Node creation confirmation email (2000) shown in FIG. 20, a Verify Graph Database Node Creation Request page (2100) shown in FIG. 21 may be displayed. The body section (2115) of this page may include controls for the user to enter the verification code that was emailed, their username, and password. After the user clicks "Verify" in the body section (2115) of the page, the system may compare the information the user entered with the entities stored in the information stream and complete the Graph Database Node creation verification process.

After verifying the Graph Database Node creation request, the user may login again through a page such as page (1400) in FIG. 14. After logging in, a page similar to the My Graph Database Nodes page (1500) shown in FIG. 15 may be displayed. Assuming the user requested created of a Graph Database Node named "Acme", the body section of the page (1515) may be expanded to show the "Acme" Graph Database Node with a status of "Building."

Access a Graph Database Node

After the Graph Database Node creation process has completed and the user logs in through a page similar to the page (1400) shown in FIG. 14, a page similar to the My Graph Database Nodes page (1500) shown in FIG. 15 may be displayed. Assuming the user requested creation of a Graph Database Node named "Acme" and the graph database node was successfully creating, the body section of the page (1515) may be expanded to show the "Acme" Graph Database Node with a status of "Available". The user may click on the name of the Graph Database Node "Acme" in the body section (1515) of a My Graph Database Nodes page to access the Acme Graph Database Node. A Graph Database Node Home page similar to the page (2200) shown in FIG. 22 may be displayed. The Graph Database Node Home page (2200) on the web site may include the following sections:

- A header section (2205): a header section typically consistent across all pages in a web site, may display a logo or other identifier, list the Company or Organization Name and a Tag Line, provide links to general pages such as about, contacts, help, for more information, the name of the Graph Database Node or node with which the page the user is viewing is associated, link or button to logout of the application, and the like.
- A menu/navigation bar (2210): a menu or navigation bar may include additional links that when clicked, may display to the user other pages of the application.
- A shortcut/secondary navigation bar (2225).
- A body section (2215): a body section of a web page typically includes the content, controls, elements, and other features that provide the primary functionality for a page.
- A Personal Folders section (2230): A section of the page that may display a file explorer view of the user's documents organized into folders and subfolders, inbox containing messages sent to the user, and outbox containing message sent by the user are displayed. Each folder in the display may be a data node in the graph database. Any subfolders of files contained in the folder are data nodes joined to the folder using edges. The user may click on the triangle to the left of any of the elements in the Personal Folders section (2230) to show an expanded view of the contents. For example, clicking on a triangle or other icon to the left of My Documents or clicking on My Documents directly in the Personal Folders Section (2230) may:
- Show an indented list of subfolders related to the My Document Folder in the Personal Folders section (2230). These subfolders, as well as the My Document Folder, may be data nodes and may be linked to the My Documents Folder using edges.
- Show a list of documents related to the My Documents Folder in the List Pane (2240). The documents may also be data nodes and may be linked to the folders through edges.
- Show a set of action buttons that may be used to perform activities specific to folders or files in the Action and Details Pane (2245). This pane may also show information related to a document data node or folder data node, such as name, description, date created, and the like.

Clicking on a triangle or other icon to the left of My Inbox or clicking on My Inbox directly in the Personal Folders Section (2230) may:

Show an indented list of Inbox data nodes in the Personal Folders section (2230). These inbox data nodes may be linked to Folders data nodes through edges, with the data nodes and edges.

Show in the List Pane (2240) a list of message data nodes linked to an Inbox folder data node using edges.

Show a set of action buttons that may be used to perform activities specific to Inbox message data nodes in the Action and Details Pane (2245). This pane may also show information linked to Inbox message data node using edges, including but not limited to sender, recipient, text of the message, and the like.

Clicking on the triangle to the left of My Outbox in the Personal Folders Section (2230) may:

Show an indented list of Outbox data nodes in the Personal Folders section (2230). These Outbox data nodes may be linked to Folders data nodes through edges, with the data nodes and edges.

Show in the List Pane (2240) a list of message data nodes linked to an Outbox folder data node using edges.

Show a set of action buttons that may be used to perform activities specific to Outbox message data nodes in the Action and Details Pane (2245). This pane may also show information linked to an Outbox message data node using edges, including but not limited to sender, recipient, text of the message, and the like.

A Group Folders section (2235): A section of the page that may display a file explorer view of the content related to Group data nodes the user is linked to through an edge. The Group data nodes may be linked to other data nodes using edges, including but not limited to data nodes such as document(s), folder(s), inbox(es), and outbox(es).

A user may click on a triangle or other icon to the left of any Group name or click on any Group name directly in the Group Folders Section (2235) to expand the file explorer display to include data nodes such as Documents, Inbox, and Outbox linked to a selected Group using edges. Clicking Documents, Inbox, and Outbox data nodes for a group provides functionality similar to that described for Documents, Inbox, and Outbox data nodes linked to Personal Folders.

Clicking on a triangle or other icon to the left of Documents data node for a Group, or clicking on Documents data node directly for a Group in the Group Folders Section (2235) may:

Show an indented list of subfolders linked using edges to the Document Folder data node in the Group Folders section (2235). These subfolders, as well as the Document Folder, may be data nodes and associated with the Documents Folder data node for the Group using edges.

Show in the List Pane (2240) a list of document data nodes linked to the Documents Folder data node using edges. The Documents Folder Data Node is linked to the selected Group using an edge as well.

Show a set of action buttons that may be used to perform activities specific to folders or files in the Action and Details Pane (2245). This pane may also show information related to a Group data node, document data node or folder data node, such as name, description, date created, and the like.

Clicking on a triangle or other icon to the left of Inbox data node linked to a group using an edge for a Group or clicking on Inbox data node directly for a Group in the Group Folders Section (2235) may:

Show an indented list of Inbox data nodes linked to a Group using edges in the Group Folders section (2235).

Show in the List Pane (2240) a list of message data nodes linked to the selected Inbox data node using edges.

Show a set of action buttons that may be used to perform activities specific to messages in the Action and Details Pane (2245). This pane may also show information related to a message, such as sender, recipient, text of the message, and the like.

A List Pane (2240): The List Pane (2240) may typically display a listing of the set of data nodes linked using edges to the data node clicked in the Personal Folder section (2230) or Group Folder section (2235). A few examples of selections in the Personal Folders section (2230) or Group Folders section (2235) and resulting display in the List Pane (2240) may include:

Clicking a Group Name data node in the Group Folder section (2235) may result in the list of user data nodes linked to the Group as members using edges being displayed in the List Pane (2240).

Clicking a Folder name data node in the Personal Folders Section may result in the list of document data nodes linked to the folder data node being displayed using edges in the List Pane (2240).

Clicking an Inbox data node for a specific Group in the Group Folder section (2235) may result in the list of message data nodes linked using edges to the inbox being displayed in the List Pane (2240).

An Action and Detail Pane (2245): The Action and Detail Pane (2245) may typically provide a list of buttons or link that can be clicked to perform an action on the data node selected in the Personal Folder section (2230), Group Folder section (2235), or List Pane (2240): A few examples of selections in the Personal Folders section (2230), Group Folders section (2235), or List Pane (2240) and resulting display in the Action and Detail Pane (2245) may include:

Clicking the name of a group member data node displayed in the List Pane (2240) may result in the display of the following in the Action and Detail Pane (2245):

Action buttons: Send Message, Remove Member, and the like

Details: User name and other user information linked to the user data node through edges Clicking on a message data node displayed in the List Pane (2240) may result in the display of the following in the Action and Detail Pane (2245):

Action buttons: Send Message, Remove Member, and the like

Details: Sender, Recipient, Data, subject, attachments, message text, and other data nodes linked to the message data node using edges.

Clicking the name of a file data node displayed in the List Pane (2240) may result in the display of the following in the Action and Detail Pane (2245):

Action buttons: Download Latest, Upload New Version, Edit Information, Move File, Share File, Delete File, and the like.

Details: File name, file extension, file size, file description, file versions, and other data nodes linked to the file using edges.

Clicking on a folder data node under My Documents in the Personal Folders section (2230) or clicking on a folder data node under Documents in the Group Folders (2235) may result in the display of the following in the Action and Detail Pane (2245):

Action buttons: Add folder, add File, Edit Folder, Move Folder, Share Folder, Delete Folder, and the like.

Details: Folder name, Folder description, and other data nodes linked to the folder using edges.

Clicking on a Group data node under in the Group Folders (2235) may result in the display of the following in the Action and Detail Pane (2245):
- Action buttons: Invite members, Edit Group, Delete Group, and the like
- Details: Group Name, Group Domain Name, Group description, and other data nodes linked to the Group using edges.
- A footer section (2220): a footer section on a web typically includes other general content and link that are less important, such as the copyright information, link to a privacy statement, the name of the user logged in and accessing the page, and the like.

Share a Subset of one Graph Database Node with Another Graph Database Node

A user may share a subset of one graph database node with another graph database node by selecting the subset to share, selecting the recipient graph database node, and optionally selecting a specific data node in the recipient graph database to link the subset to. For example, suppose a user wanted to share a folder data node, including all of the subfolder and file data nodes linked to it through edges with a user on another graph database node. One method for sending the other graph database node the folder send a subset of a graph database node is by "attaching" the subset to a message. Another option may be to copy the subset from one node to another node.

A user may begin the process of sharing a subset of the graph database node by selecting a file or folder of interest from one of their Graph Database Node view as shown in FIG. 23 may be displayed. FIG. 23 is an illustrative graphical user interface showing an exemplary Select a Subset of a Graph for Sharing page for a web application built on a system configured according the principles of the disclosure, generally denoted by reference numeral 2300. This Select a Subset for Sharing page may include the following:
- Title (2305): May display the title of the popup as Subset Selector.
- Action Buttons (2310): Buttons a user may click to either Attach to accept the selection of a file(s) and/or folder(s) to be attached to the message, or Cancel the attaching process.
- A body section (2315): a body section of a web page typically includes the content, controls, elements, and other features that provide the primary functionality for a page.
- Personal Folders (2320): A file explorer-like view of Personal folder data nodes that the user may expand and contract to view other data nodes linked to it using edges by clicking the triangle or icon to the left of folder name or directly clicking the folder name to expand the view so that is lists any folders that may exist in another folder.
- Select a Personal Folder: A user may select a Personal folder data node to attach by clicking the folder name of interest and then clicking the Select Active Folder button (2335). The system will then add the folder data node and all linked subfolders and file to the Selected section (2340).
- Select a File in a Personal Folder: The user may view the list of file data node linked to a Personal folder using edges by clicking the folder name of interest. The Available Files section (2330) may display the list of files linked to the folder. The user may select a file to attach by double-clicking the file name. The system may add the name of the double-clicked file to the Selected section (2340).
- Group Folders (2325): A file explorer-like view of Group folder data nodes that the user may expand and contract to view the list of file and folder data nodes linked to it using edges by clicking the triangle or icon to the left of folder name or directly clicking the folder name data node to expand the view so that is lists any folders that may exist in another folder.
- Select a Group Folder: A user may select a Group folder data node to attach by clicking the folder name of interest and then clicking the Select Active Folder button (2335). The system will then add the folder and all linked subfolders and file to the Selected section (2340).
- Select a File in a Group Folder: The user may view the list of file data nodes linked to a Group folder data node using edges by clicking the folder name of interest. The Available Files section (2330) may display the list of file data nodes linked to the folder. The user may select a file to attach by double-clicking the file name. The system may add the name of the double-clicked file to the Selected section (2340).
- Select Active Folder (2335): May be used to select a highlighted Folder data node from the Personal folders section (2320) or to select a highlighted Folder from the Group folders section (2325) and add it to the Selected section (2340).
- Available Files (2330): May display the list of file data nodes contained in a highlighted Folder from the Personal folders section (2320) or a highlighted Folder from the Group folders section (2325)
- Selected (2340): May display the name of the selections and whether each is a file of folder.

After selecting the file data node(s) and or folder data node (s) to attached, the user may click the Share action button (2310) and the system may initiate the process to extract the subset of the graph corresponding to the selected data nodes and edges, and display the Share Options Popup (2400). FIG. 24 is an illustrative graphical user interface showing an exemplary Share Options popup for a web application built on a system configured according the principles of the disclosure, generally denoted by 2400. The Share Option popup (2400) may include the following:
- Title (2405): May display the title of the popup as Share Options
- Action Buttons Buttons a user may click to:
- Share the selected subset of the graph by sending it as an attachment to a message (2410),
- Share the selected subset of the graph by copying it to a folder (2415),
- Share the selected subset of the graph directly with another graph (2425),
- Cancel the share process (2420).

If the user chooses to share the subset of the graph that corresponds to the selected Folder as an attachment to a message (2410), the Create Message popup (2505) shown in FIG. 25 may be displayed with the attachment corresponding to the selected folder listed in the Attachments line (2520). The user may enter a message to be sent with the subset of the graph that corresponds to the selected folder data node, and may click Address Book to select a specific recipient at a specific graph database node to receive the shared subset. After clicking the Address Book button (2510), the Select Recipient page (2605) shown in FIG. 26 may be displayed. Using this interface, the user may first select the graph database node the subset should be shared with on the left side of the page (2620) by clicking on the name of the recipient graph database node. The user may click on the triangle to the left of the graph database node name to view a partial or full list of users on that node to select a one or more specific recipient. The selected recipients may be displayed on the right side of the page (2625). After completing selections, the user may click Save Selections (2610) and the Create message for Shared subset popup (2505) may again be displayed. The user may then click Send (2510) to send the subset to the recipient graph database node. The system merges the subset with the recipient graph database node and make it available to the selected recipient user. The recipient may view the message in his or her inbox and save the link the subset to any of the other data nodes accessible to him or her in the receiving graph database node.

Alternatively, a shared subset may be sent directly to another database node. The user may choose this option by selecting Share the selected subset of the graph directly with another graph (2425) from the page (2400) shown in FIG. 24. After selecting Share the selected subset of the graph directly with another graph (2425), the Select a Graph Database Node as a Sharing Recipient page (2705) as shown in FIG. 27 may be displayed. Using this interface, the user may select the graph database node the subset should be shared with on the left side of the page (2720) by clicking on the name of the recipient graph database node. The selected graph recipient database node may be displayed on the right side of the page (2725). After completing selections, the user may click Send (2710) and the system may forward the selected subset of the graph to the recipient graph database node where it may be merged.

All flow diagrams herein (including FIGS. 8-11) and any drawing showing relational type constructs (e.g., FIGS. 3-7) may equally represent a high-level block diagram of computer-based components of the invention implementing any steps thereof. The steps and/or components may be implemented as computer logic or computer code in combination with the appropriate computing hardware. This computer program code or computer logic may be stored on storage media such as a diskette, hard disk, CD-ROM, DVD-ROM or tape, as well as a memory storage device or collection of memory storage devices such as read-only memory (ROM) or random access memory (RAM), for example. Additionally, the computer program code can be transferred to a workstation over the Internet or some other type of network. The computer code may be a computer program product that may be stored on a computer readable medium that when read and executed by a computer processor executes the computer code (or logic) and the process thereof.

While the various aspects of the invention has been described in this disclosure by way of illustrative examples, those skilled in the art will recognize that the principles herein can be practiced with modifications and in the spirit and scope of the appended claims. All documents referenced herein including patent applications are incorporated by reference herein in their entirety. If there are any conflicts between this disclosure and any priority application or document incorporated by reference, then this disclosure governs.

I claim:

1. A computer-based network system comprising:
    a plurality of graph database nodes so that any subset of information contained in any of the plurality of graph database nodes is shareable with any other graph database node in the network system using a merge operation, wherein
        the plurality of graph database nodes comprises at least two data nodes and at least one edge linking the at least two data nodes,
        the subset of information also comprises at least one data node,
        the at least one data node contains immutable data so that the at least one data node is evolvable through the addition of at least one new edge that is also a data node, and the at least one new edge links at least one data node to at least one other data node so that the integrity of the at least one data node, the at least one other data node, and the at least one edge is maintainable during sharing and merging of the subset of information throughout the plurality of graph database nodes,
        whereby the any of the plurality of graph database nodes data nodes and the any other graph database node is at least partially synchronizable; and
    at least one computer processor for performing at least the merge operation.

2. The computer-based network system of claim 1, wherein the merge operation is accomplishable through a union operation that expands the information of the any other graph database node.

3. The computer-based network system of claim 2, wherein the any of the plurality of graph database nodes is partially synchronizable with the any other graph database node so that distributed collaboration on the subset of information occurs through the addition of any one or more of: a new edge joining at least one data node from the subset of information with at least one data node from the any other graph database node, the addition of a new data node from the subset of information and a new edge joining that new data node with a data node from the any other graph database node, and the addition of a new edge from the subset of information joining two data nodes already contained in the any other graph database node, thereby expanding the amount of information linked to the any other graph database node.

4. The computer-based network system of claim 3, wherein a second subset that includes the any subset of information is shareable through a merge operation with any graph database node.

5. The computer-based network system of claim 1, wherein the at least one edge is also a data node defined by a Form, wherein the Form defines the immutable properties of the at least one edge.

6. The computer-based network system of claim 1, wherein each the plurality of graph database nodes evolve separately and are selectively synchronizable.

7. The computer-based network system of claim 1, wherein the immutable data includes an identifier and a date/timestamp thereby providing a basis for knowing the state of the computer-based network system at any point in time.

8. The computer-based network system of claim 1, wherein the subset of information contained in the any of the plurality of graph database nodes information is an entire graph database node.

9. The computer-based network system of claim 1, wherein the at least one data node is defined by a Form, wherein the Form defines the immutable properties of the at least one data node.

10. The computer-based network system of 9, wherein each data node evolves through the addition of any one of new edges linking existing data nodes and new data nodes with new edges linking those new data nodes to at least one existing data node.

11. The computer-based network system of claim 1, wherein the plurality of graph database nodes are deployable on at least one of a virtual server and physical server, each with or without firewalls.

12. The computer-based network system of claim of 1, wherein the plurality of graph database nodes are communicative through an electronic communications protocol.

13. The computer-based network system of claim 12, wherein the electronic communications protocol is any of an internet protocol, telecommunications protocol, networking protocol, and data transfer protocol.

14. The computer-based network system of claim 1, wherein each graph database node is an entity.

15. The computer-based network system of claim 1, wherein each edge is a relationship.

16. The computer-based network system of claim 15, wherein changes are signified only through new relationships creating new linkages between entities.

17. The computer-based network system of claim 16, wherein the plurality of graph database nodes each comprises an entity.

* * * * *